(12) United States Patent
Gandhi et al.

(10) Patent No.: US 11,514,186 B2
(45) Date of Patent: Nov. 29, 2022

(54) INTEGRATED DATABASE USER PRIVILEGE MANAGEMENT

(71) Applicant: SAP SE, Walldorf (DE)

(72) Inventors: Unmesh Vidhyadhar Gandhi, Cote Saint Luc (CA); Sumesh Nair, Montreal (CA); Pascal Riera, Montreal (CA); Eric Primeau, Longueuil (CA); Evelyna Holban, Montreal (CA)

(73) Assignee: SAP SE, Walldorf (DE)

( * ) Notice: Subject to any disclaimer, the term of this patent is extended or adjusted under 35 U.S.C. 154(b) by 42 days.

(21) Appl. No.: 17/230,787

(22) Filed: Apr. 14, 2021

(65) Prior Publication Data

US 2022/0335148 A1 Oct. 20, 2022

(51) Int. Cl.
*G06F 21/62* (2013.01)
*G06F 3/0482* (2013.01)
*G06F 16/21* (2019.01)

(52) U.S. Cl.
CPC ........ *G06F 21/6227* (2013.01); *G06F 3/0482* (2013.01); *G06F 16/21* (2019.01); *G06F 2221/2141* (2013.01)

(58) Field of Classification Search
CPC .................................................. G06F 21/6227
USPC .......................................................... 726/1
See application file for complete search history.

(56) References Cited

U.S. PATENT DOCUMENTS

| | | | | |
|---|---|---|---|---|
| 6,128,771 A * | 10/2000 | Tock | ...................... | G06F 9/4493 707/999.001 |
| 7,535,994 B1 * | 5/2009 | Hines, III | ........... | G06F 21/6227 707/999.1 |
| 7,693,917 B2 * | 4/2010 | Chariot | ................... | G06F 16/22 707/804 |
| 8,875,128 B2 * | 10/2014 | Elyashev | ............ | G06F 9/45558 718/1 |
| 10,025,801 B2 * | 7/2018 | Kaufman | ............... | G06F 3/0481 |
| 10,430,605 B1 * | 10/2019 | Nerurkar | ............. | G06F 21/6254 |
| 10,715,516 B1 * | 7/2020 | Colletta | .................. | G06F 21/33 |

(Continued)

OTHER PUBLICATIONS

Keii Jones, screenshot of Tutorial posted at youtube, "Quick Tutorial—Users and Permissions in SQL Server" available online at [ https://www.youtube.com/watch?v=Mkw7tRfh2_8], Feb. 25, 2017 (Year: 2017).*

(Continued)

*Primary Examiner* — Reza Nabi
(74) *Attorney, Agent, or Firm* — Klarquist Sparkman, LLP

(57) ABSTRACT

A method for integrated database user privilege management can be implemented. The method presents a computer interface for managing access privileges of one or more users to a database comprising independent data and dependent data, and retrieves one or more role objects, record filter objects, and attribute filter objects assigned to a user. A role object defines access privileges to selected values of the independent data and dependent data. A record filter object can modify the access privileges defined in the one or more role objects. An attribute filter object defines access privileges to selected attributes of the independent data. The method can calculate, and present on the computer interface, a list of attributes of the independent data and a list of dependent data that the user has access privileges based on the one or more role objects, record filter objects, and attribute filter objects assigned to the user.

16 Claims, 26 Drawing Sheets

(56) References Cited

U.S. PATENT DOCUMENTS

| | | | | |
|---|---|---|---|---|
| 11,206,313 | B1* | 12/2021 | Dey | H04L 63/10 |
| 11,222,133 | B1* | 1/2022 | Gassner | G06F 21/6227 |
| 2003/0200215 | A1* | 10/2003 | Chen | G06F 21/10 |
| | | | | 707/999.009 |
| 2003/0200443 | A1* | 10/2003 | Chen | G06F 21/6218 |
| | | | | 713/182 |
| 2003/0200466 | A1* | 10/2003 | Nelson | H04L 63/205 |
| | | | | 707/999.009 |
| 2006/0123229 | A1* | 6/2006 | Holloway | G06F 21/6227 |
| | | | | 713/166 |
| 2007/0006322 | A1* | 1/2007 | Karimzadeh | G06F 21/6227 |
| | | | | 726/28 |
| 2007/0027875 | A1* | 2/2007 | Mitchell | G06Q 30/02 |
| 2012/0271854 | A1* | 10/2012 | Truong | G06F 21/41 |
| | | | | 707/E17.005 |
| 2013/0159324 | A1* | 6/2013 | Xu | G06F 16/2471 |
| | | | | 707/754 |
| 2014/0040314 | A1* | 2/2014 | Ebrahimi | G06F 16/25 |
| | | | | 707/783 |
| 2017/0339156 | A1* | 11/2017 | Gupta | H04L 63/0807 |
| 2018/0225344 | A1* | 8/2018 | Fang | G06F 16/21 |
| 2018/0357444 | A1* | 12/2018 | Kammath | G06F 21/6227 |
| 2019/0108361 | A1* | 4/2019 | Shirole | G06F 16/248 |
| 2019/0163802 | A1* | 5/2019 | MacLean | G06F 16/27 |
| 2019/0332795 | A1* | 10/2019 | Woodward | G06F 21/6227 |
| 2020/0162453 | A1* | 5/2020 | Blinn | G06Q 30/016 |
| 2020/0320216 | A1* | 10/2020 | Piecko | G06F 16/21 |
| 2021/0012254 | A1* | 1/2021 | Campbell | G06Q 30/0185 |
| 2021/0019434 | A1* | 1/2021 | Bibliowicz | G06F 16/90335 |
| 2021/0034777 | A1* | 2/2021 | Xie | G06F 21/6227 |
| 2021/0117517 | A1* | 4/2021 | Bregman | G06F 21/31 |
| 2021/0149645 | A1* | 5/2021 | Kang | H04L 67/306 |
| 2022/0198031 | A1* | 6/2022 | Yuan | G06F 21/31 |

OTHER PUBLICATIONS

Jeff Melnick, "How to Implement Row and col. Level Security in SQL Server" online available at [ https://blog.netwrix.com/2019/06/27/how-to-implement-row-and-column-level-security-in-sql-server/] published on Jun. 27, 2019 (Year: 2019).*

Jared Hillam, "Master Data vs Transaction Data," https://www.linkedin.com/pulse/master-data-vs-transaction-jared-hillam, printed Feb. 15, 2021, 4 pages.

Innoscale, "Master Data: What is the difference between master data and transaction data?" https://innoscale.de/en/difference-master-data-and-transaction-data/, Feb. 4, 2020, 3 pages.

FX Nicolas, "Back to Basics: Transactional, Master, Golden and Reference Data explained," https://blog.semarchy.com/backtobasics_data_classification, Oct. 10, 2018, 6 pages.

Agus Syafat, "An Overview of MongoDB User Management," https://severalnines.com/database-blog/overview-mongodb-user-management, Apr. 29, 2020, 12 pages.

"Understand OData in 6 steps," https://www.odata.org/getting-started/understand-odata-in-6-steps/, Understand OData in 6 steps—Odata—the Best Way to REST, printed Feb. 12, 2021, 6 pages.

* cited by examiner

| Product Group | Product | Location | Key Figures | W01 2021 | W02 2021 | W03 2021 |
|---|---|---|---|---|---|---|
| Hair Product | Shampoo | Montreal | Consensus Demand | 84 | 90 | 88 |
| | | | Sales Forecast QTY | 86 | 93 | 89 |
| | | Toronto | Consensus Demand | 112 | 108 | 110 |
| | | | Sales Forecast QTY | 115 | 110 | 112 |
| | Conditioner | Montreal | Consensus Demand | 78 | 75 | 80 |
| | | | Sales Forecast QTY | 80 | 78 | 82 |

FIG. 1

| User | User ID | Email | Roles | User Grps | Attr Perm | Perm Filters | Unrestricted Perm |
|---|---|---|---|---|---|---|---|
| Example Account Planner | XX000000040 | account_planner@sap.com | 1 | 4 | 4 | 40 | Yes |
| Example Configuration Expert | XX000000044 | config_expert@sap.com | 1 | 0 | 2 | 0 | Yes |
| Example Demand Planner | XX000000041 | demand_planner@sap.com | 1 | 6 | 5 | 2 | Yes |
| Example Demand Planner – Bi | XX000000532 | demand_plnr_biz@sap.com | 1 | 0 | 2 | 0 | Yes |
| Example Inventory Planner | XX000000042 | inventory_planner@sap.com | 1 | 3 | 3 | 1 | Yes |
| Example Supply Chain Analyst | XX000000045 | sc_analyst@sap.com | 1 | 1 | 2 | 0 | Yes |
| Example Supply Chain Analyst | XX000000950 | supplier@sap.com | 1 | 5 | 1 | 0 | Yes |
| Example Supply Planner | XX000000043 | supply_planner@sap.com | 1 | 1 | 2 | 1 | Yes |
| Example Supply Planner – Bis | XX000000533 | supply_plnr_biz@sap.com | 1 | 0 | 2 | 0 | Yes |
| John Administrator | XX000000046 | Administrator@sap.com | 1 | 0 | 3 | 0 | Yes |

| User | User ID | Email | Roles | User Grps | Attr Perm | Perm Filters | Unrestricted Perm |
|---|---|---|---|---|---|---|---|
| Example Account Planner | XX000000040 | account_planner@sap.com | 1 | 4 | 4 | 40 | Yes |
| Example Configuration Expert | XX000000044 | config_expert@sap.com | 1 | 0 | 2 | 0 | Yes |
| Example Demand Planner | XX000000041 | demand_ | | | | | |
| Example Demand Planner -- Bi | XX000000532 | demand_ | | | | | |
| Example Inventory Planner | XX000000042 | inventory_ | | | | | |
| Example Supply Chain Analyst | XX000000045 | sc_analyst | | | | | |
| Example Supply Chain Analyst | XX000000950 | supplier@ | | | | | |
| Example Supply Planner | XX000000043 | supply_pl | | | | | |
| Example Supply Planner -- Bis | XX000000533 | supply_pl | | | | | |
| John Administrator | XX000000046 | Administr | | | | | |

Attribute Permissions (2)

| Name | Description |
|---|---|
| Copy_of_SAP_ALL_ATTRIBUTES | Unrestricted read and write access |
| SAP_ALL_ATTRIBUTES | Unrestricted read and write access |

FIG. 10

User Permissions ▽

Example Supply Planner -- Business Partner
XX0000000533

Copy User Permissions

Changed by: SAP system Processing   Status
Changed on: 08/05/2020, 20:20:32    Offline User Information | Roles (1) | User Groups (1) | Attribute Permissions (2) ⌄ | Permission Filters (1) ⌄ | Key Figures | Master Data Attributes

Personal Data

User Data

Last Name:
Supply Planner -- Business Partner

User Name:
SUPPLY_PLNR_BIZ

First Name:
Example

User ID:
XX0000000533

Person ID:
8980000533

Valid From:
Wed Aug 05 2020 20:00:00 GMT-0400 (Eastern Daylight Time)

Email:
supply_plnr_biz@sap.com

Valid To:
Thu Dec 30 9999 19:00:00 GMT-0500 (Eastern Standard Time)

Phone:

Locked:
No

Location:

| | | Copy User Permissions |
|---|---|---|
| Example Supply Planner – Business Partner XX0000000533 | | |
| Changed by: SAP system Processing | Status | |
| Changed on: 08/05/2020, 20:20:32 | Offline | |

User Information · Roles (1) · User Groups (1) · Attribute Permissions (2) ⌄ · Permission Filters (1) ⌄ · Key Figures · Master Data Attributes Items (1)

| Role ID ▲ | Description | Changed By | Changed On | Unrestricted Permission Filters |
|---|---|---|---|---|
| SAP_BR_SUPPLY_PLNR_BIZ | Supply Planner – Business Partner | SAP IBP System | 10/05/2020, 00:35 | Yes |

1010 → Permission Filters
1030 → (row)
1032 → Unrestricted Permission Filters
1000 → (overall screen)

Example Supply Planner – Business Partner
XX0000000533

User Permissions | Copy User Permissions

User Information | Roles (1) | User Groups (1) | Attribute Permissions (2) | Permission Filters (1) | Key Figures | Master Data Attributes

1010

Direct Assignments

Items (1) | Search | Assign Remove Save Cancel

| Name | Description | Planning Area | Changed By | Changed On |
|---|---|---|---|---|
| EL-RESTRICTION | TEST | MTL2UNIT | | 06/26/2020, 14:41 |

1060

Select Permission Filter | Clear

| | | X Q |

Selected: 4

| | ID | Description | Planning Area |
|---|---|---|---|
| ☐ | MTL2_AUTOGEN1000_101 | MTL2_AUTOGEN1000_101 | MTL2UNIT |
| ☐ | MTL2_AUTOGEN1000_102 | MTL2_AUTOGEN1000_102 | MTL2UNIT |
| ☒ | MTL2_AUTOGEN1000_103 | MTL2_AUTOGEN1000_103 | MTL2UNIT |
| ☐ | MTL2_AUTOGEN1000_104 | MTL2_AUTOGEN1000_104 | MTL2UNIT |
| ☒ | MTL2_AUTOGEN1000_105 | MTL2_AUTOGEN1000_105 | MTL2UNIT |
| ☒ | MTL2_AUTOGEN1000_106 | MTL2_AUTOGEN1000_106 | MTL2UNIT |
| ☐ | MTL2_AUTOGEN1000_107 | MTL2_AUTOGEN1000_107 | MTL2UNIT |
| ☒ | MTL2_AUTOGEN1000_108 | MTL2_AUTOGEN1000_108 | MTL2UNIT |
| ☐ | MTL2_AUTOGEN1000_109 | MTL2_AUTOGEN1000_109 | MTL2UNIT |

Assign | Cancel

1064

Indirect Assig...
Items (0)

| Name |
|---|
| |

1000

< | My Permissions ▾

Example Supply Chain Analyst
XX0000000045

Changed by: SAP system Processing    Status
Changed on: 08/05/2020, 20:20:31    Logged On
Last Logon: 10/05/2020, 17:05:31

Copy User Permissions

<u>User Information</u>   Roles (1)   User Groups (1)   Attribute Permissions (2) ⌄   Permission Filters (0) ⌄   Key Figures   Master Data Attributes

Personal Data    User Data

Last Name:    User Name:
Supply Chain Analyst    SC_ANALYST

First Name:    User ID:
Example    XX0000000045

Person ID:    Valid From:
8980000045    Wed Aug 05 2020 20:00:00 GMT-0400 (Eastern Daylight Time)

Email:    Valid To:
sc_analyst@sap.com    Thu Dec 30 9999 19:00:00 GMT-0500 (Eastern Standard Time)

Phone:    Locked:
   No

Location:

| | | |
|---|---|---|
| < My Permissions | | Copy User Permissions |
| Example Supply Chain Analyst
XX00000000045 | | |
| Changed by: SAP system Processing
Changed on: 08/05/2020, 20:20:31
Last Logon: 10/05/2020, 17:05:31 | Status
Logged On | |
| User Information Roles (1) User Groups (1) Attribute Permissions (2) ∨ Permission Filters (0) ∨ Key Figures Master Data Attributes |||

2310

Items (1)

Search

| Role ID ▲ | Description | Changed By | Changed On | Unrestricted Permission Filters |
|---|---|---|---|---|
| SAP_BR_SC_ANALYST | Supply Chain Analyst | SAP IBP System | 10/05/2020, 00:35 | Yes |

INTEGRATED DATABASE USER PRIVILEGE MANAGEMENT

BACKGROUND

Database user privilege management is an essential part of data security for any organization. As databases move to the cloud environment, software applications, as well as database management are also deployed to the cloud foundry to support more users and easier usage. However, such change brings new challenges to database user privilege management because conventional methods of user privilege management do not scale well. User privilege management also becomes more complicated in cloud computing services that support multitenancy, where a service provider can support multiple clients of different customers (called "tenants") within a cloud solution. For example, in a database-as-a-service (DBaaS) environment, multitenancy means that the cloud solution can support multiple users accessing multiple databases from multiple tenants, and each tenant can have one or more databases. Users can be grouped into the multiple tenants, where users of a tenant can share a common access with certain specific privileges to the DBaaS resources. Accordingly, there is room for improved user privilege management in cloud database operations.

BRIEF DESCRIPTION OF THE DRAWINGS

FIG. 1 is an example data table illustrating relationship between transaction data and master data.

FIG. 8 is an example user interface of an integrated user privilege management application that can read and write permission objects of users, where the user interface lists multiple users and a summary of permission objects assigned to the multiple users.

FIG. 9 is an example user interface of the integrated user privilege management application of FIG. 8, where content of a permission object is shown in a popup window.

FIG. 10 is an example user interface of the integrated user privilege management application of FIG. 8, where detailed information of a user is displayed.

FIG. 11 is an example user interface of the integrated user privilege management application of FIG. 8, where a list of roles assigned to a user are displayed.

FIG. 15 is an example user interface of the integrated user privilege management application of FIG. 8, where a list of attribute permissions assigned to a user are displayed.

FIG. 17 is an example user interface of the integrated user privilege management application of FIG. 8, where a list of permission filters assigned to a user are displayed.

FIG. 18 is an example user interface of the integrated user privilege management application of FIG. 8, where one or more permission filters can be assigned and/or unassigned to a user.

FIG. 23 is an example user interface of another integrated user privilege management application that can read but not write permission objects of a user, where the user interface lists a summary of permission objects assigned to the user.

FIG. 24 is an example user interface of the integrated user privilege management application of FIG. 23, where a list of roles assigned to the user are displayed.

DETAILED DESCRIPTION

Figure 2:
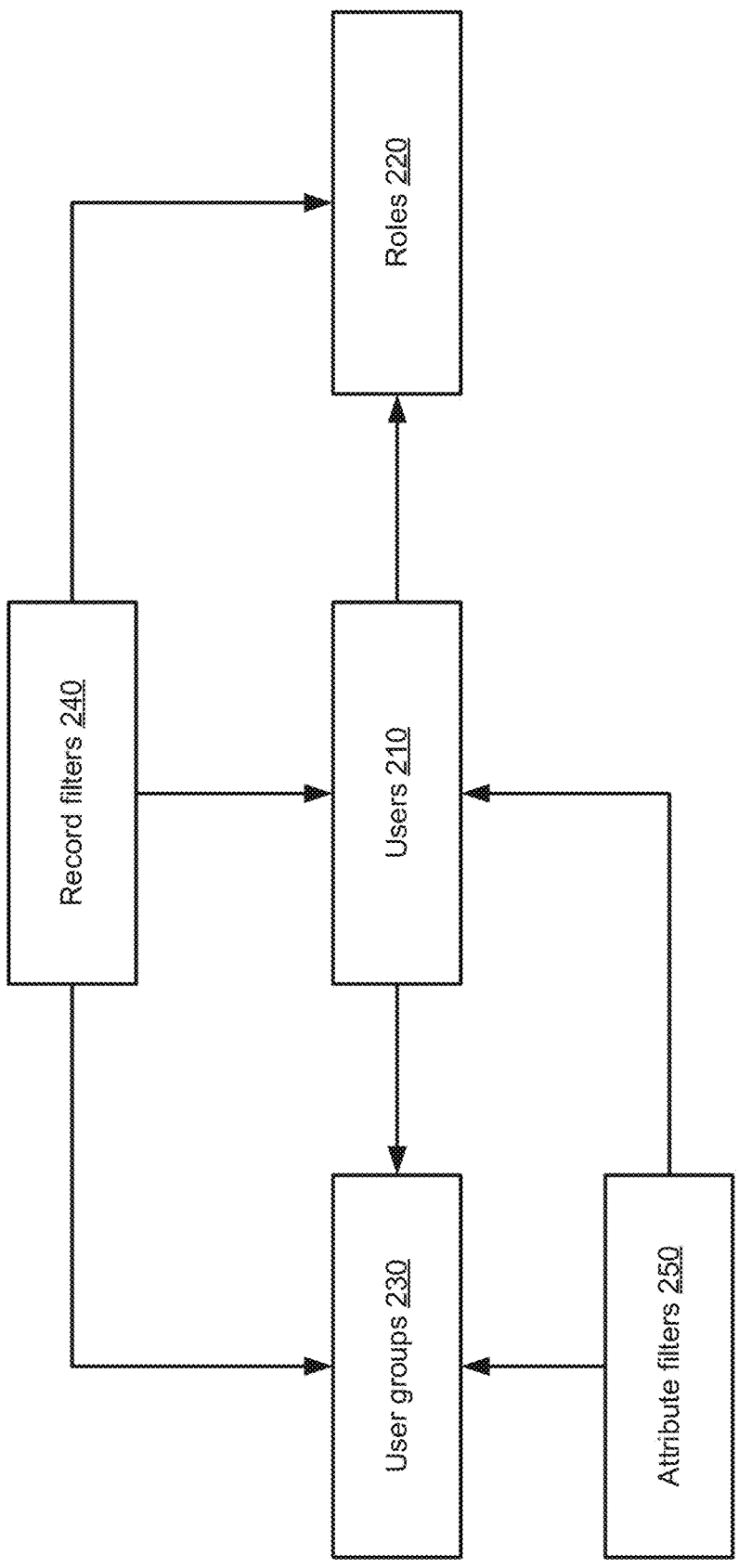
FIG. 2 is a block diagram illustrating inter-relationship between users, user groups, roles, record filters, and attribute filters in an example database user privilege management system.

Example 1—Example Overview of Database User Privilege Management

Database user privilege management is a core feature of enterprise software. For example, administrators can grant, revoke, and/or modify user access rights or privileges to various database resources, some of which may contain confidential and/or sensitive information. Thus, user privilege management is an essential part of data security for any organization. However, as more databases move to the cloud environment and more cloud computing services support multitenancy, database user privilege management becomes increasingly complicated.

For example, many database management systems adopt certain types of role-based access control. Typically, a plurality of roles are created for various job functions, business processes, user types, or organizations. Each role has a collection of access rights or privileges (e.g., read and/or write) to certain entities of the databases that are assigned to that particular role. Different users (e.g., system administrators, software developers, demand planners, supply planners, customers, etc.) can be assigned different roles through which they obtain permissions or privileges to access certain types of data in the databases. Users are not given permissions or privileges to access databases directly; instead they inherit them through their respectively assigned role (or roles). In addition, users can be assigned to user groups. For examples, users who perform the same job functions or in the same team can be grouped into the same user group. In some cases, a user who has multiple job functions can be assigned into multiple different user groups.

In addition to roles and user groups, some user privilege management systems provide more fine-grained access control as an extra layer of data security for databases. For example, enterprise databases typically include both master data and transaction data, and various privilege filters can be used to control what master data and/or transaction data are accessible to a user.

As described herein, master data generally refer to domain-based data that support the transactions, such as parties (e.g., departments, customers, suppliers, etc.), products, locations, etc. Master data typically include master data attributes and corresponding attribute values. For example, a master data attribute can be named "Country" and the corresponding attribute values can be country names (e.g., "Canada," "United States," etc.). As another example, a master data attribute can be named "Product" and the corresponding attribute values can be product names (e.g., "Shampoo," "Conditioner," etc.), product identifiers, product brands, etc. On the other hand, transactional data generally describe business events in an enterprise, such as data related to purchase orders, sales records, shipping receipts, etc. Transaction data can include key figures and data entries corresponding to respective key figures. For example, a key figure named as "Sales Forecast QTY" can represent a metric about forecasted sales quantity, and the corresponding data entries can be actual numbers of sales forecast data for different time periods. Generally, master data do not change frequently in the databases, and transaction data are more volatile (i.e., changed more frequently) than master data.

For illustration purposes, FIG. 1 shows an example data table 100. In this example, the first three columns 110 of the data table 100 contain master data, which include three master data attributes 120 (i.e., "Product Group," "Product," and "Location") and corresponding attribute values 130 (e.g., "Hair Product," "Shampoo," "Conditioner," "Montreal," and "Toronto"). The fourth column contains two key FIG. 140 (e.g., "Consensus Demand" and "Sales Forecast QTY"), and the remaining columns contain data entries 150 corresponding to the key FIG. 140.

Key figures often depend on master data. To illustrate, in FIG. 1, the key figures "Consensus Demand" and "Sales Forecast QTY" may dependent on what "Product" in what "Product Group" sold in which "Location." For example, the "Sales Forecasts QTY" for "Shampoo" sold in "Montreal" can be different from the "Sales Forecasts QTY" for "Shampoo" sold "Toronto," as well as different from the "Sales Forecasts QTY" for "Conditioner" sold in "Montreal." Thus, as described herein, the master data can also be referred to as "independent data," and the key figures can also be referred to as "dependent data." Accordingly, as described herein, master data attributes (e.g., "Product," "Country," etc.) are also referred to as "attributes of independent data," and attribute values (e.g., "Canada," "United States," "Shampoo," "Conditioner," etc.) are also referred to as "values of independent data." Further, the names, labels, values, or other identifiers of key figures (e.g., "Sales Forecast QTY") are also referred to as "values of dependent data."

As described below in more details, certain user privilege management systems provide privilege filters, which can include attribute filters (also referred to as "attribute permissions") which restrict a user from accessing certain attributes of master data, and/or record filters (also referred to as "permission filters") which restrict a user from accessing certain attribute values and key figures.

For example, an attribute filter can be configured so that when it is applied to a user, the user can see certain master data attributes (e.g., "Product ID," "Product Name," etc.) but not other master data attributes (e.g., "Brand"). Note that the attribute filter is defined based on master data attributes, not attribute values. In other words, the attribute filter controls whether a user can see either all or none of the values corresponding to a master data attribute (e.g., "Brand"); it does not control data visibility base on a particular attribute value (e.g., "Nike" as a value corresponding to the "Brand" attribute).

As another example, a record filter can be configured so that when it is applied to a user, the user is permitted to read a key figure (e.g., "Sales Forecast Quantity") related to a particular "Region" (e.g., "North America") and a specific "Product Group" (e.g., "Hair Products"), but is only permitted to edit such key figure (e.g., "Sales Forecast Quantity") related to a specific "Country" (e.g., "Canada") and a specific "Product ID" (e.g., "P001") for which the user is responsible. In this example, "Region," "Product Group," "Country," and "Product ID" are master data attributes, and "North America," "Hair Products," "Canada," and "P001" are corresponding attribute values. Thus, record filters are based on attribute values and can give granular access to database tables. In certain embodiments, the access privileges assigned to a role can be granted through record filters. In other words, a role can comprise one or more record filters which collectively define the access privileges (e.g., to certain key figures and attribute values) assigned to the role. After assigning such a role to a user, the user will inherit all such access privileges defined by the record filters. On the other hand, by directly assigning and/or unassigning certain record filters to a user without changing roles assigned to the user, the user's access privileges can be modified (e.g., adding more access privileges) when compared to user's access privileges originally inherited from the assigned roles.

Thus, the privilege filters can modify the access privileges assigned to a user through roles and/or user groups, as illustrated in the following example in reference to FIG. 1. Assume a predefined role is named as "Demand Planner," which grants access privileges to the key figures including "Consensus Demand" and "Sales Forecast QTY." Also assume an attribute filter named "PRDLOC_Read" is created, which grants access privileges to the master data attributes including "Product Group," "Product," and "Location." Further assume a record filter named "Demand_KF_Read" is created, which grants access privileges if the following logical operation returns TRUE: "Product Group"="Hair Products" AND ("Product"="Shampoo" OR "Conditioner") AND ("Location"="Montreal" OR "Toronto"). If the role "Demand Planner" is assigned to a user, the attribute filter "PRDLOC_Read," and the record filter "Demand- _KF_Read," then the user have access to all the data shown in table 100. This is because the three master data attributes satisfy the attribute filter "PRDLOC_Read," the combinations of attribute values satisfy the logical operation specified by the record filter "Demand_KF_Read," and the key figures are derived from the role "Demand Planner." On the other hand, the user will not be able to access key figures related to a different "Product Group" (e.g., "Dental Product"), or a different "Product" within the same "Product Group" (e.g., "Hair Dye"), or a different "Location" for the same "Product" within the same "Product Group" (e.g., "Calgary"). Likewise, the user will not be able to access other unlisted master data attributes (e.g., "Product ID," "Country," etc.). However, without the attribute filter "PRDLOC_Read," the user having the role "Demand Planner" would be able to access other unlisted master data attributes (e.g., "Product ID," "Country," etc.). Also, without the record filter "Demand_KF_Read," the user having the role "Demand Planner" would be able to access other unlisted attribute values (e.g., "Dental Product," "Hair Dye," "Calgary," etc.). Thus, to what extend a user has access privileges to a database can be determined by which role(s), record filter(s), and/or attribute filter(s) assigned to the user. For example, the record filter(s) and attribute filter(s) can effectively restrict a user from accessing certain rows and columns of a database table which the user would otherwise have privileges to access based solely on the user's role (and/or the user group to which the user belongs).

For illustration purposes, FIG. 2 shows a diagram 200 depicting the inter-relationship between users, user groups, roles, record filters, and attribute filters in an example database user privilege management system. As shown, the users 210 can be associated with different roles 220. In addition, the users 210 can be assigned to one or more user groups 230. Record filters 240 can be assigned to users 210, roles 220, and user groups 230. Further, attribute filters 250 can be assigned to users 210 and user groups 230 (but not the roles 220).

In practical implementations, the database user privilege management system can represent or model users 210, roles 220, user groups 230, record filters 240 and attribute filters 250 as objects. As described herein, the objects representing roles 220 (i.e., role objects), user groups 230 (i.e., user group objects), record filters 240 (i.e., record filter objects), and attribute filters 250 (i.e., attribute filter objects) are collectively referred to as "permission objects" (or alternatively, "privilege objects.").

Because of the inter-relationship between users 210, roles 220, user groups 230, record filters 240 and attribute filters 250, changing one object can impact other objects and related access privileges to certain master data attributes and/or key figures. For example, changing a record filter can affect related access privileges to key figures, and changing an attribute filter can affect related access privileges to master data attributes. In addition, changing a role object can cause corresponding changes to associated record filter objects and access privileges to related key figures. Further, changing a user group object can cause corresponding changes to associated record filters objects and attribute filter objects, as well as access privileges to related key figures and master data attributes.

As can be appreciated, the task of user privilege management can become very complicated due to the inter-relationship between users, roles, user groups, attribute filters, and record filters, especially when the number of users, roles, user groups, attribute filters, and record filters is large. For example, when the database user privilege management system needs to manage thousands of users who may be associated with hundreds of roles and/or user groups, which can be further modified by hundreds of privilege filters, the tasks of reviewing and/or editing a user's access privileges to the database can become overwhelming and error-prone. Trouble shooting can also be challenging. For example, when one user can access certain master data and/or key figures of a database table but another user cannot, it can be cumbersome to compare the roles, user groups, attribute filters, and record filters between the two users to identify why their access privileges differ, let alone making proper corrections.

Thus, it would be advantageous for an improved database user privilege management tool that supports more user-centric and easy-to-use environment which provides an integrated and comprehensive view on permission objects assigned to different users, and provides real-time feedback on the impact of assignment or un-assignment of certain permission objects to the users. As described below, such tool can greatly simply and/or assist database user privilege management. In addition, such improved database user privilege management technologies can be applied across a wide variety of enterprise software environments.

Figure 3:
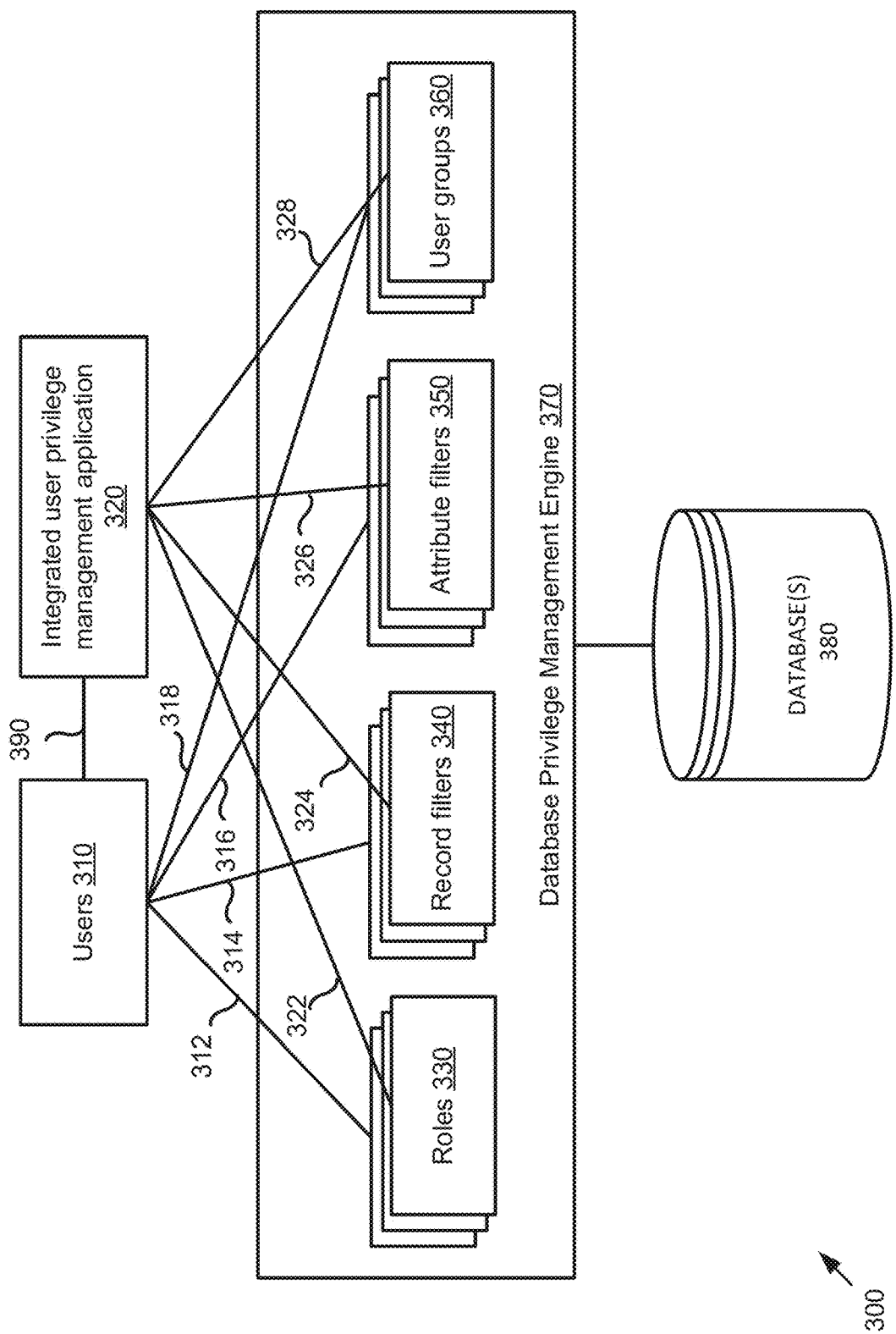
FIG. 3 is an overall block diagram of an example computing system configured to implement an improved database user privilege management technology.

Example 2—Example Overview System for Improved Database User Privilege Management FIG. 3 shows an overall block diagram of an example system 300 configured to implement an improved database user privilege management technology.

As shown, the system 300 includes a database privilege management engine 370, which can control access privileges of users 310 (which can be database administrators) to database(s) 380. The database privilege management engine 370 can include a plurality of role objects 330, record filter objects 340, attribute filter objects 350, and user group objects 360 (collectively referred to as "permission objects" or "privilege objects"). Each user 310 can be directly associated with one or more role objects 330, one or more record filter objects 340, one or more attribute filter objects 350, and/or one or more user group objects 360, as indicated by the lines 312, 314, 316, and 318, respectively.

User assignment to the permission objects can be implemented by different software applications or gateway services depending on the type of permission objects. For example, one application can assign a role object to a user, a second application can assign a record filter object to a user, a third application can assign an attribute filter object to a user, and a fourth application can assign a user to a user group. Managing access privileges of users by directly invoking these applications, however, can be tedious and error prone, especially when the number of users, roles, user groups, attribute filters, and/or record filters is large.

As described herein, an integrated user privilege management application 320 can serve as an intermediary between the users 310 and the database privilege management engine 370, as illustrated in FIG. 3. The integrated user privilege management application 320 can integrate the application programming interfaces (APIs) of multiple software applications that manage respective permission objects (e.g., 330, 340, 350, and 360) and provide a unified graphical user interface (GUI) through which the users 310 can view and/or edit different permission objects (e.g., 330, 340, 350, and 360). Thus, users 310 do not need to directly interface with the permission objects by invoking respective applications (as indicated by the lines 312, 314, 316, and 318). Instead, users 310 can simply interface with the integrated user privilege management application 320 (as indicated by the line 390), which in turn manages the permission objects in a more streamlined and coherent manner, as described further below.

Example 3—Example Overview of Database Privilege Management Engine

Figure 4:
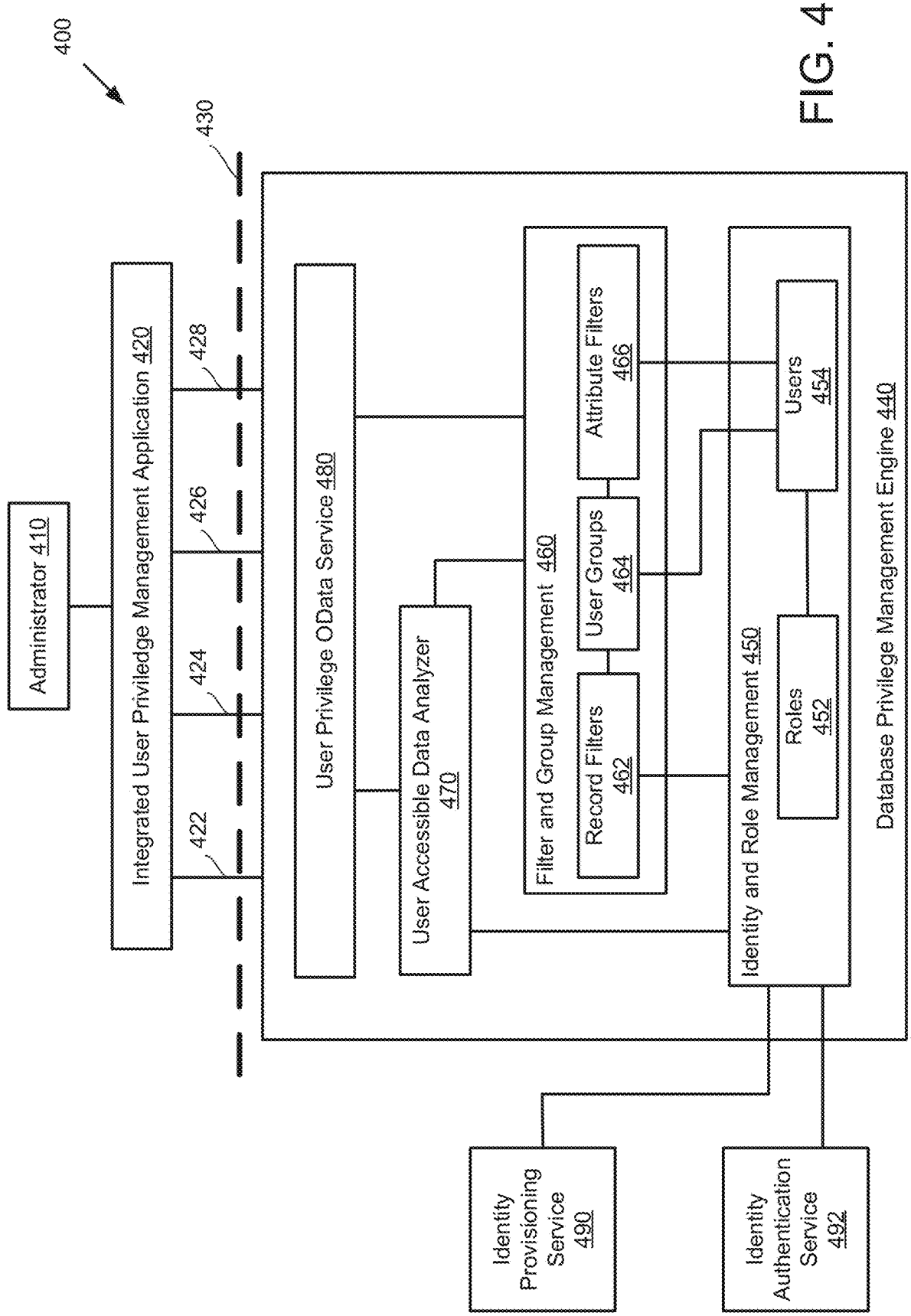
FIG. 4 is an example block diagram illustrating components of a database privilege management engine and their interface with an integrated user privilege management application.

FIG. 4 shows an example block diagram illustrating a user privilege management system 400 including a database privilege management engine 440 and an integrated user privilege management application 420. The database privilege management engine 440 can be one example embodiment of 370, and the integrated user privilege management application 420 can be an example embodiment of 320. In an example embodiment, the database privilege management engine 440 can be located on the cloud. The integrated user privilege management application 420 can also be deployed in the cloud, and is accessible via local computers, including desktops, laptops, and other mobile computing devices such as tablets, smartphones, etc.

As shown, an administrator 410 can interface with the integrated user privilege management application 420, which in turn can interact with the database privilege management engine 440, e.g., via an open data protocol (OData) 430. Specifically, the integrated user privilege management application 420 can include a plurality of APIs (e.g., 422, 424, 426, 428, etc.) through which users of the database(s) (e.g. 380) can be associated with various permission objects (e.g., role objects, record filter objects, attribute filter objects, user group objects), as described below. In an example embodiment, such APIs can communicate with a user privilege OData service 480 (which provides OData support) located in the database privilege management engine 440. In certain embodiments, the APIs can allow applications to read as well as to write permission objects. Example read operations can include obtaining access privileges defined in role objects, obtaining key figures and master data attributes to which a user has access privileges, etc. Example write operations can include assigning certain permission objects to a user, copying or cloning permission objects associated one user to another user, etc. Such read and write operations allow the administrator 410 to view as well as to change users' access privileges. In other embodiments, the APIs can be limited to applications that can read but not write permission objects. Such read-only operations allow an end user (e.g., other than the administrator) to view, but not change, his own and/or some other users' access privileges.

The database privilege management engine 440 can include an identity and role management unit 450 configured for user and role management. Specifically, the identity and role management unit 450 can maintain a plurality of user objects 454, each of which corresponds to a registered user of the database(s). In certain embodiments, the user objects 454 can be created directly by the database privilege management engine 440, for example, when users register for database services. In certain embodiments, the user objects 454 can be supplied by external systems such as an identity provisioning service 490. In addition, authentication of the user objects 454 (i.e., verification of the identities of users) can be performed by an identity authentication service 492, which can be located external to the database privilege management engine 440. In addition, the identity and role management unit 450 can create and maintain a plurality of role objects 452 which can be assigned to different user objects 454.

The database privilege management engine 440 can also include a filter and group management unit 460, which can create and maintain a plurality of record filter objects 462, a plurality of user group objects 464, and a plurality of attribute filter objects 466. The filter and group management unit 460 can interact with the identity and role management unit 450. For example, a user object 454 can be assigned to one or more user group objects 464, one or more attribute filter objects 466 can be assigned to a user object 454, one or more record filter objects 462 can be assigned to a user object 454 or a role object 452. In addition, one or more record filter objects 462 and/or one or more attribute filter objects 466 can be assigned to a user group object 464. As a result, a user with an established user object 454 can be granted access privileges directly via assigned role objects 452, record filter objects 462, and/or attribute filter objects, or indirectly via user group objects 464 to which the user object 454 is assigned.

The database privilege management engine 440 can further include a user accessible data analyzer 470 which can determine, in real-time, a list of key figures and a list of master data attributes that are accessible for each user object 454, based on the permission objects associated with the user objects 454. For example, when the administrator 410 changes the assignment of attribute filter objects to a user object, or changes the assignment of the user object to different user group objects, the user accessible data analyzer 470 can automatically calculate and update the list of master data attributes to which the corresponding user has access privileges. In another example, when the administrator 410 changes the assignment of record filter objects and/or role objects to a user object, or changes the assignment of the user object to different user group objects, the user accessible data analyzer 470 can automatically calculate and update the list of key figures to which the corresponding user has access privileges, as explained further below.

In practice, the systems shown herein, such as the systems 300 and 400, can vary in complexity, with additional functionality, more complex components, and the like. For example, there can be additional functionality within the database privilege management engine 440. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The systems 300 and 400 and any of the other systems described herein can be implemented in conjunction with any of the hardware components described herein, such as the computing systems described below (e.g., processing units, memory, and the like). In any of the examples herein, the user objects, the permission objects, the master data attributes and attribute values, the key figures, and the like can be stored in one or more computer-readable storage media or computer-readable storage devices. The technologies described herein can be generic to the specifics of operating systems or hardware and can be applied in any variety of environments to take advantage of the described features.

Example 4—Example Calculation of User's Access Privileges to Key Figures

As noted above, key figures typically depend on master data. Thus, whether or not a user has access privileges to certain key figures typically depends on the user's access privileges to related master data. Specifically, the user's access privilege to a key figure can be determined by a logical operation involving a plurality of attribute values, e.g., via a record filter. If the user's access privilege to one of the plurality of attribute values is removed, then the user's access privilege to the key figure is also removed. For example, in FIG. 1, the key FIG. 140 are determined by the logical operation of attribute values 130 via a record filter "Demand_KF_Read." If the user's access privilege to the attribute value "Conditioner" is removed (i.e., the user will not be able to see "Conditioner" in the "Product" column), then the user's access privileges to the corresponding key figures are also removed (i.e., the user will not be able to see the last two rows of data related to "Consensus Demand" and "Sales Forecast QTY" for "Conditioner" product).

In certain embodiments, the logical relationship between key figures and related master data can be represented by key figure data models. As described herein, a key figure data model can include a plurality of key figure entities and relationship between the key figure entities. Each key figure entity represents a corresponding key figure and can include a set of master data attributes, the combination of which can determine a user's access privilege to the corresponding key figure, e.g., by a record filter as described above. A data model can be represented in a tree structure where the key figure entities are represented by nodes and their relationships can be represented by edges that connect related nodes. In an example embodiment, the user accessible data analyzer 470 can maintain or have access to the key figure data models. Thus, by traversing the tree structure of a data model, the user accessible data analyzer 470 can calculate a user's access privileges to key figures represented by the key figure entities.

Figure 5:
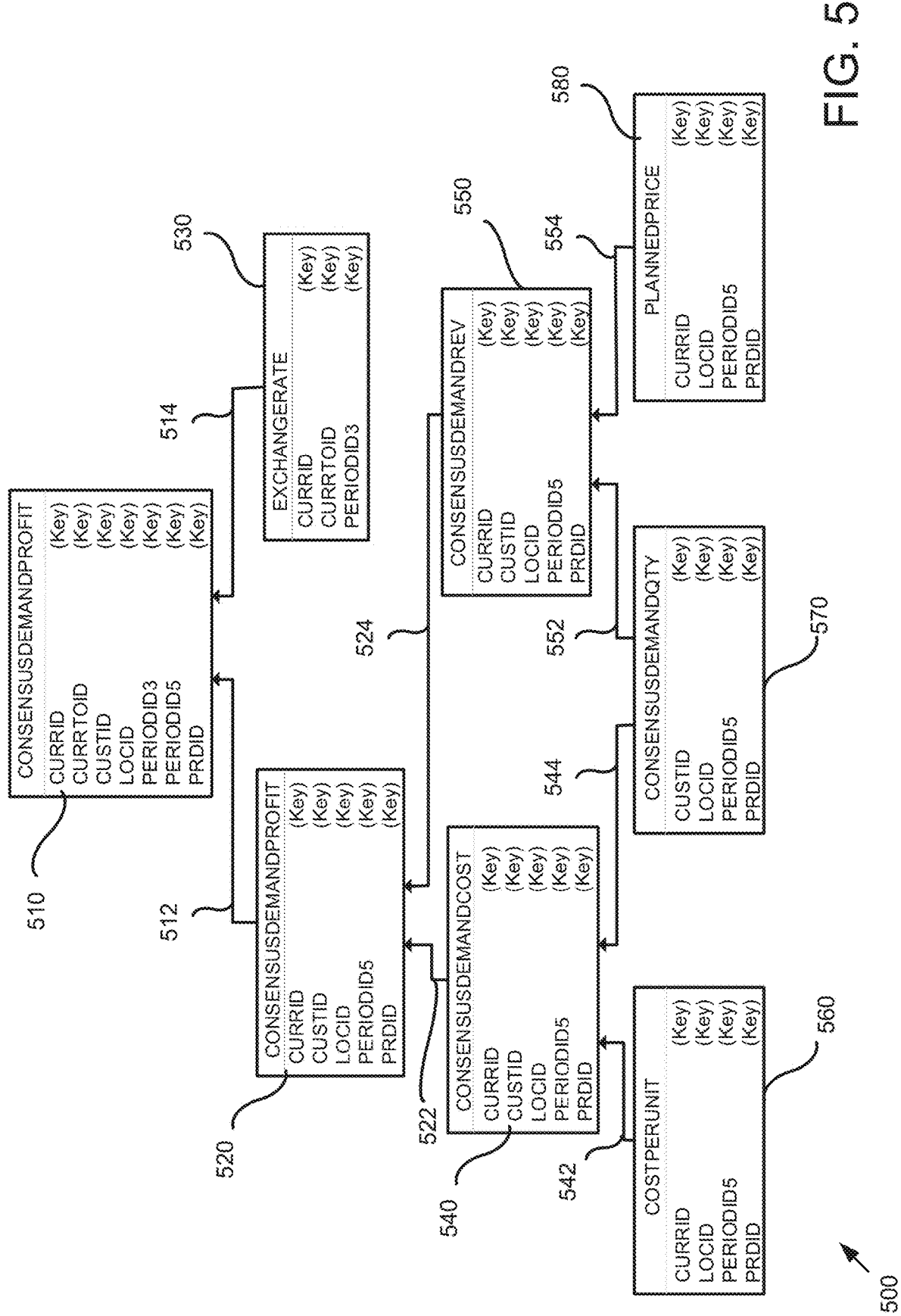
FIG. 5 is an example model diagram illustrating calculation of a key figure based on a calculation tree.

To illustrate, FIG. 5 shows an example key figure data model 500 represented in a tree structure. In this example, the key figure data model 500 includes a root node 510 (representing a key figure "CONSENSUSDEMAND-PROFIT") at the top of the tree structure, and four leaf nodes 530, 560, 570, and 580 respectively representing four key figures "EXCHANGERATE," "COSTPERUNIT," "CONSENSUSDEMANDQTY," and "PLANNEDPRICE." In addition, the key figure data model 500 includes intermediary nodes 520 (representing a key figure "CONSENSUS-DEMANDPROFIT"), 540 (representing a key figure "CON-SENSUSDEMANDCOST"), and 550 (representing a key figure "CONSENSUSDEMANDREV") that connect the root note 510 to the leaf nodes 530, 560, 570, and 580 via edges (e.g., 512, 514, 522, 524, 542, 544, 552, and 554).

A user has access privilege to a key figure represented by a parent node if and only if the user has access privileges to key figures represented by all children nodes linked to the parent node. For example, a user has access privilege to the key figure represented by the root node 510 if and only if the user has access privileges to the key figures represented by the nodes 520 and 530. Likewise, the user's access privilege to the key figures represented by the node 520 is determined by the user's access privileges to the key figures represented by the nodes 540 and 550, which further depend on the user's access privileges to the key figures represented by the nodes 560, 570, and 580. Thus, by traversing the tree structure, the user's access privilege to the key figure represented by the root node 510 is ultimately determined by the user's access privileges to the key figures represented by all leaf nodes 530, 560, 570, and 580. For example, if the user does not have access privilege to the key figure "EXCHANGERATE" represented by leaf node 530, then the user also does not have access privilege to the key figure "CONSENSUSDEMANDPROFIT" represented by the root node 510.

Each node representing a key figure can include a plurality of master data attributes whose combination can determine a user's access privilege to the corresponding key figure. For example, the access privilege to key figure "CONSENSUSDEMANDQTY" represented by the leaf node 570 can be determined by a record filter defining a logical operation involving master data attributes including "CUSTID," "LOCID," and "PRDID." Thus, if the user's access privilege to one of the master data attributes (e.g., "LOCID") is removed (e.g., by applying an attribute filter limiting the user's access privilege to such master data attribute), then the user's access privilege to the corresponding key figure "CONSENSUSDEMANDQTY" is also removed. Similarly, the user can also lose access privilege to the key figure "CONSENSUSDEMANDQTY" by applying a record filter to the node 570 if the record filter does not have conditions on the master data attributes values for "CUSTID," "LOCID," or "PRDID". Accordingly, by traversing the tree structure, the user's access privileges to the key figure "CONSENSUSDEMANDPROFIT" represented by the root node 510 and key figures represented by other intermediary parent nodes (e.g., 520, 540, and 550) are also removed.

Thus, the set of key figures to which a user has access privileges can be determined from an intersection between key figures accessible by roles assigned to the user and key figures which are determined to be accessible by traversing the tree structures of key figure data models and applying the record filters to the leaf nodes. In other words, while the roles assigned to the user can define an initial set of key figures to which the user has access privileges, such initial set of key figures can be reduced to a subset (i.e., the user can lose access privileges to some of the key figures) because of record filters applied to nodes in the key figure data models. As noted above, every time there is a change of record filter objects assigned to a user object, the user accessible data analyzer 470 can traverse the tree structures of relevant key figure data models and re-evaluate the corresponding user's access privileges to the corresponding key figures. The result of such re-evaluation can be automatically presented to the administrator 410 in real-time by the integrated user privilege management application 420.

Figure 6:
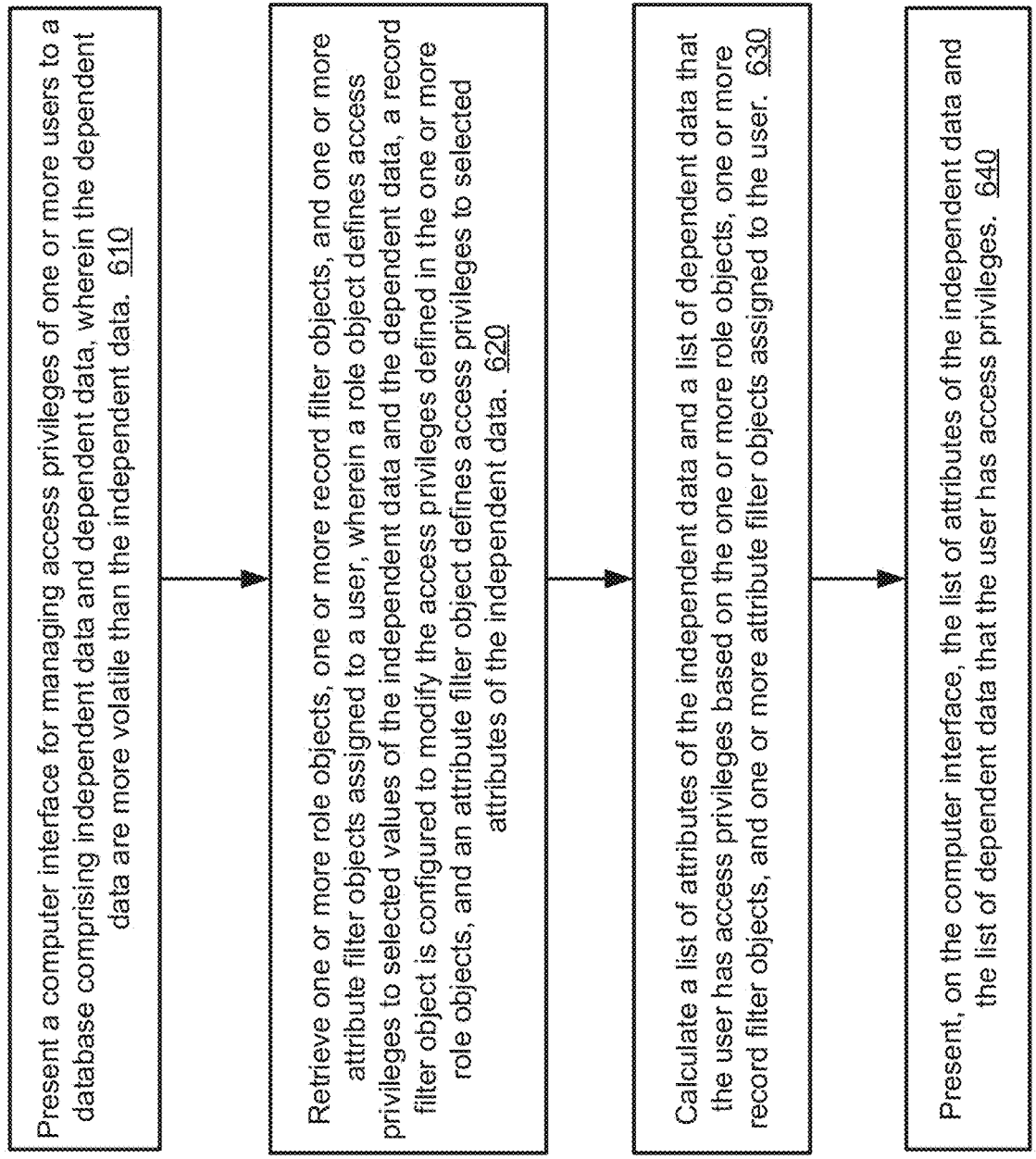
FIG. 6 is a flowchart illustrating an example overall method of implementing the improved database user privilege management technology.

Example 5—Example Overall Method of Implementing Improved Database User Privilege Management Technology FIG. 6 is a flowchart 600 illustrating an example overall method of implementing the improved database user privilege management technology. The method can be implemented, for example, by the integrated user privilege management application 420 described above.

At 610, the method can present a computer interface for managing access privileges of one or more users to a database comprising independent data (e.g., master data) and dependent data (e.g., key figures). As described above, the dependent data are generally more volatile (i.e., change more frequently) than the independent data.

At 620, the method can retrieve one or more role objects, one or more record filter objects, and one or more attribute filter objects assigned to a user. A role object can define access privileges to selected values of the independent data and the dependent data, a record filter object can be configured to modify the access privileges defined in the one or more role objects, and an attribute filter object can define access privileges to selected attributes of the independent data.

At 630, the method can calculate a list of attributes of the independent data and a list of dependent data that the user has access privileges based on the one or more role objects, one or more record filter objects, and one or more attribute filter objects assigned to the user.

At 640, the method can present (e.g., display or summarize), on the computer interface, the list of attributes of the independent data and the list of the dependent data that the user has access privileges.

Figure 7:
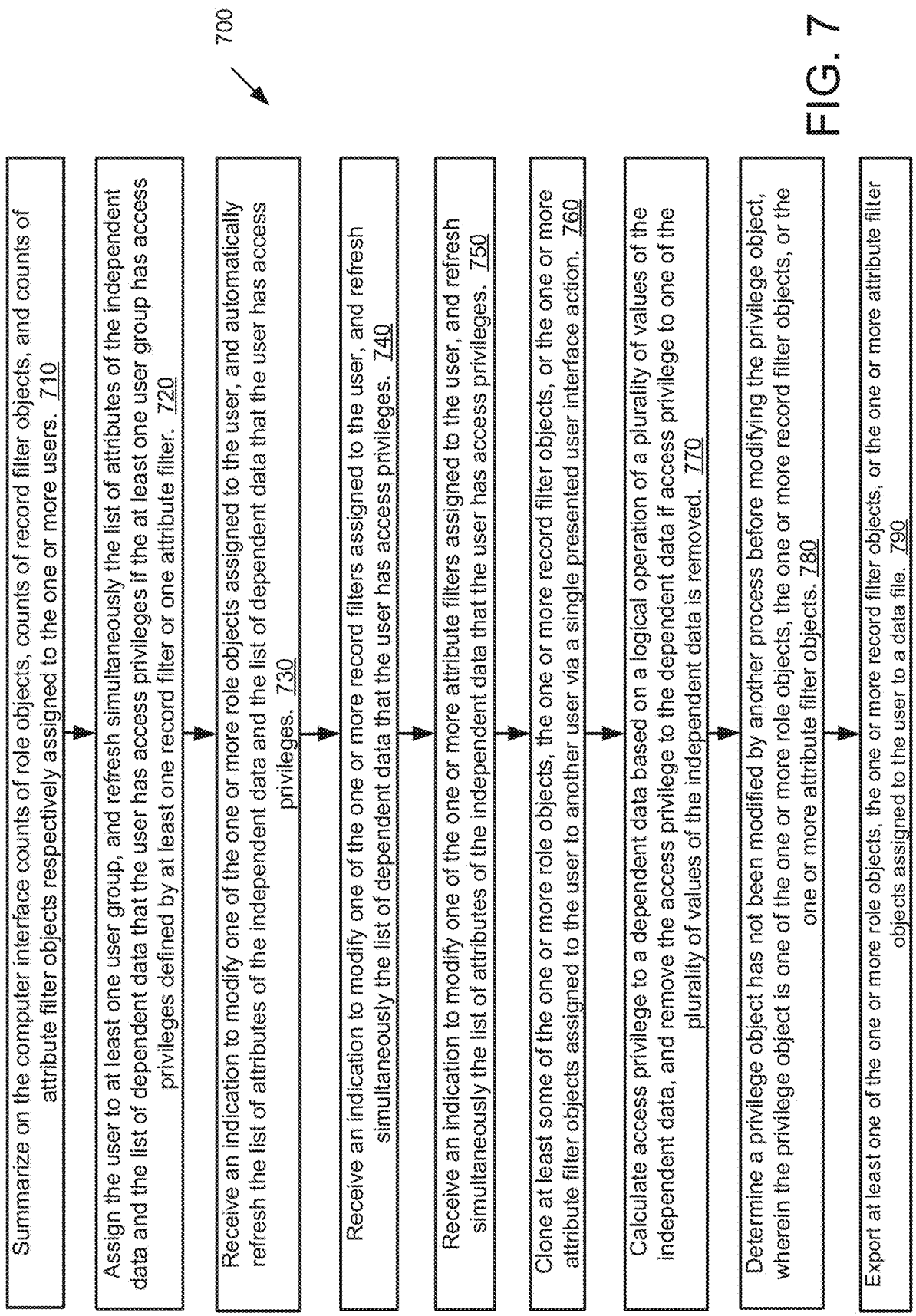
FIG. 7 is a flowchart illustrating an example method of implementing additional features of the improved database user privilege management technology.

The method can include additional steps, any of which can be optional, as illustrated in the flowchart 700 shown in FIG. 7. For example, at 710, the method can summarize, on the computer interface, counts of role objects, counts of record filter objects, and counts of attribute filter objects respectively assigned to the one or more users. At 720, the method can assign the user to at least one user group, and refresh simultaneously the list of attributes of the independent data and the list of dependent data that the user has access privileges if the at least one user group has access privileges defined by at least one record filter or one attribute filter. At 730, the method can receive an indication to modify one of the one or more role objects assigned to the user, and automatically refresh or update—in a simultaneous or real-time manner (e.g., within a second)—the list of attributes of the independent data and the list of dependent data that the user has access privileges. At 740, the method can receive an indication to modify one of the one or more record filters assigned to the user, and automatically refresh or update—in a simultaneous or real-time manner (e.g., within a second)—the list of dependent data that the user has access privileges. At 750, the method can receive an indication to modify one of the one or more attribute filters assigned to the user, and automatically refresh or update—in a simultaneous or real-time manner (e.g., within a second)—the list of attributes of the independent data that the user has access privileges. At 760, the method can clone or copy at least some of the one or more role objects, the one or more record filter objects, or the one or more attribute filter objects assigned to the user to another user via a single user interface action. At 770, the method can calculate access privilege to a dependent data based on a logical operation of a plurality of values of the independent data, and remove the access privilege to the dependent data if access privilege to one of the plurality of values of the independent data is removed. At 780, the method can check the data consistency, e.g., determine a privilege object has not been modified by another process, before modifying the privilege object, wherein the privilege object is one of the one or more role objects, the one or more record filter objects, or the one or more attribute filter objects. At 790, the method can export at least one of the one or more role objects, the one or more record filter objects, or the one or more attribute filter objects assigned to the user to a data file. As described below, the method can also export the list of user group objects associated with the user, the list of key figures to which the user has access privileges, as well as the list of master data attributes to which the user has access privileges.

The method depicted in FIGS. 6-7 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "retrieve" can also be described as "send" from a different perspective.

Example 6—Example User Interfaces of Integrated User Privilege Management Application for Administrators FIGS. 8-22 show some example user interfaces of an integrated user privilege management application (e.g., 420) that can be used by administrators (e.g., 410). As described below, through such user interfaces, an administrator can easily assign/unassign permission objects to users and can evaluate the impact in real-time. The administrator can also compare the permission objects assigned to different users, and can also copy certain permission objects from one user to another. The interfaces are configured to facilitate troubleshooting the access privilege issues as it lists the impact of permission objects on the master data and key figures. The administrator can also navigate to specific permission objects to perform further analysis. Further, the administrator can download relevant information (e.g., permission objects assigned to multiple users, etc.) for audit or root-cause analysis purposes.

As an example, FIG. 8 shows a user interface 800 of the integrated user privilege management application that can read and write permission objects 820 assigned to multiple users 810 (which can be represented by respective user objects). As shown, the user interface 800 show an overview page which lists multiple users 810 and some relevant user information (e.g., User ID, Email address) and a summary of permission objects 820 assigned to multiple users. The user interface 800 can be configured to provide an easy filtering mechanism based on the username (e.g., users can be sorted and/or searched based on username) The permission objects 820 depicted include role objects (labelled as "Roles"), user group objects (labelled as "User Grps"), attribute filter objects (labelled as "Attr Perm"), and record filter objects (labelled as "Perm Filters"). The user interface 800 also lists the counts 830 of different permission objects assigned to each user 810. Thus, an administrator can compare the counts 830 of different permission objects assigned to different users 810. Such comparison can provide an overview of different users' access privileges and may quickly reveal differences between permission objects assigned to two different users, thus facilitating trouble shooting of users' access privilege issues (e.g., to explain why one user has certain access privileges but another user has not).

In addition, the administrator can have a quick view of each permission object assigned to each user, e.g., by moving a cursor over or clicking on a respective count number. As an example, FIG. 9 shows the user interface 800 after clicking the count (2) corresponding to the attribute filter object (i.e., "Attr Perm") assigned to user "Example Configuration Expert." As shown, a popup window 840 can appear which lists the two attribute filters (i.e., "Copy_of_SAP_ALL_ATTRIBUTES" and "SAP_ALL_ATTRIBUTES") assigned to such user and corresponding descriptions of these two attribute filters.

Further, FIG. 10 shows an example user interface 1000 of the integrated user privilege management application, where details page of a selected user ("Example Supply Planner—Business Partner" in this example) can be displayed. Selection of the user can be implemented in a number of ways, e.g., by double clicking on a user's name listed in 810, clicking a button corresponding the user (see, e.g., the sign ">" 840 in FIG. 8), or the like. As shown, the user interface 1000 can include a plurality of tabs 10010, through which the administrator can navigate to different screens/windows to view and/or edit different information about the user. For example, selecting the "User Information" tab can display detailed user information 10020, which can be configured to be read-only. Other tabs can correspond to respective permission objects (including counts) assigned to the user such as "Roles" (for role objects), "User Groups" (for user group objects), "Attribute Permissions" (for attribute filter objects), and "Permission Filters" (for record filter objects), or summary of key figures and master data attributes, as described further below.

Figure 12:
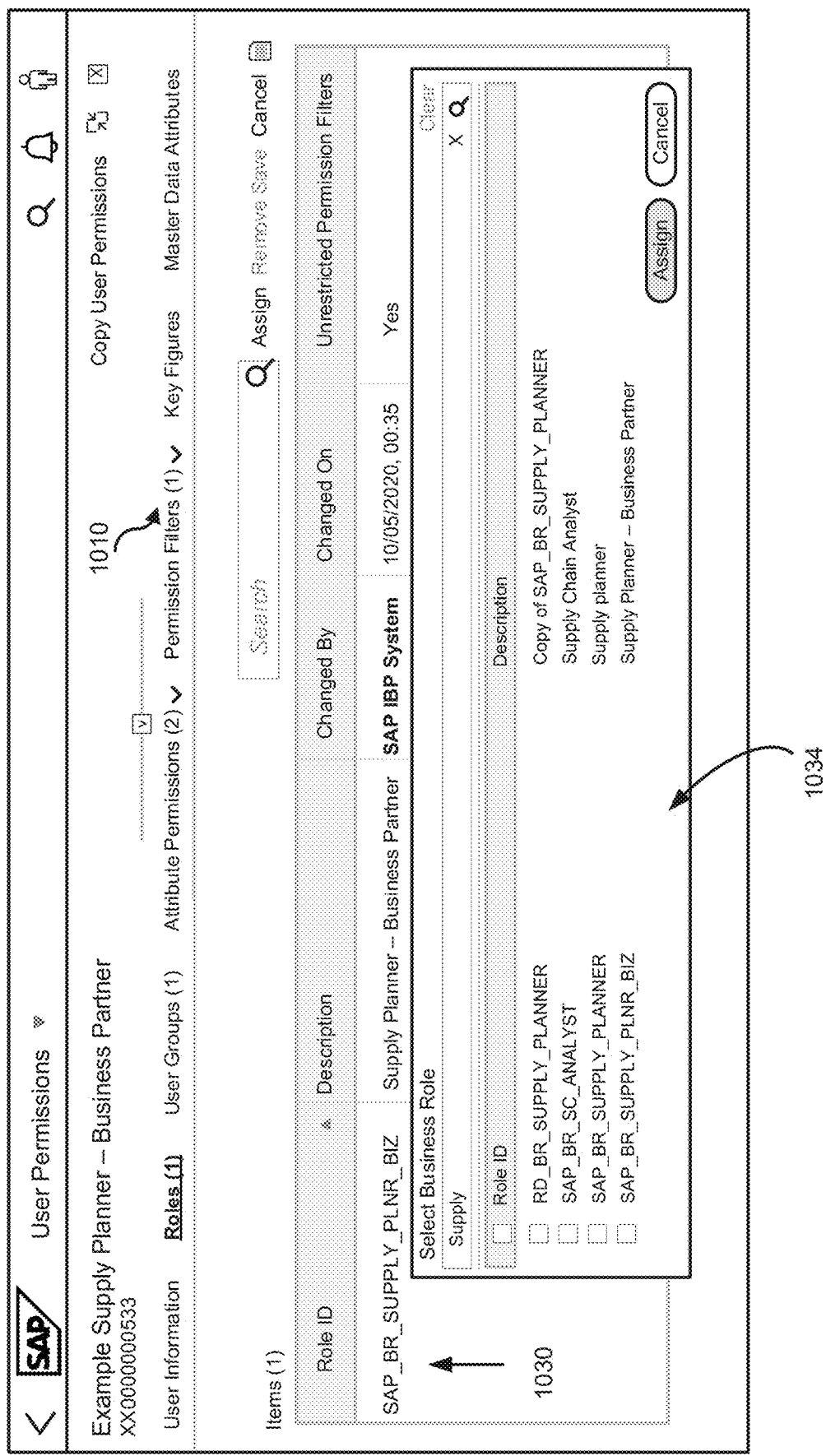
FIG. 12 is an example user interface of the integrated user privilege management application of FIG. 8, where one or more roles can be assigned and/or unassigned to a user.

FIG. 11 shows the example user interface 1000 when the "Roles" tab is selected. In certain embodiments, selecting the "Roles" tab can invoke another application (e.g., via a corresponding API) that manages the role objects. As shown, all role objects 1030 assigned to the selected user and related information of the role objects (e.g., description, changed by, changed on, etc.) can be displayed. In this example, the selected user "Example Supply Planner—Business Partner" has only one assigned role object "SAP_BR_SUPPLY_PLNR_BIZ." In addition, the administrator can edit role objects assigned to the selected user. For example, by clicking an "Edit" button 1032, a popup window 1034 can appear, as shown in FIG. 12, which lists a plurality of role objects that can be assigned and/or unassigned to the selected user (e.g., by checking and/or unchecking boxes associated with the respective role objects). As described above, changing role objects assigned to a user can cause corresponding changes to associated record filter objects and access privileges to related key figures. Thus, by navigating to the "Permission Filters" tab or "Key Figures" tab, the administrator can immediately see the impact of assignment and/or un-assignment of the roles objects to the selected user. In addition, the administrator can navigate to a specific role object (e.g., via hyperlink or other means) to perform further analysis. Further, the user interface 1000 can be configured to support download functionality through which the administrator can export the list of role objects assigned to the selected user.

Figure 13:
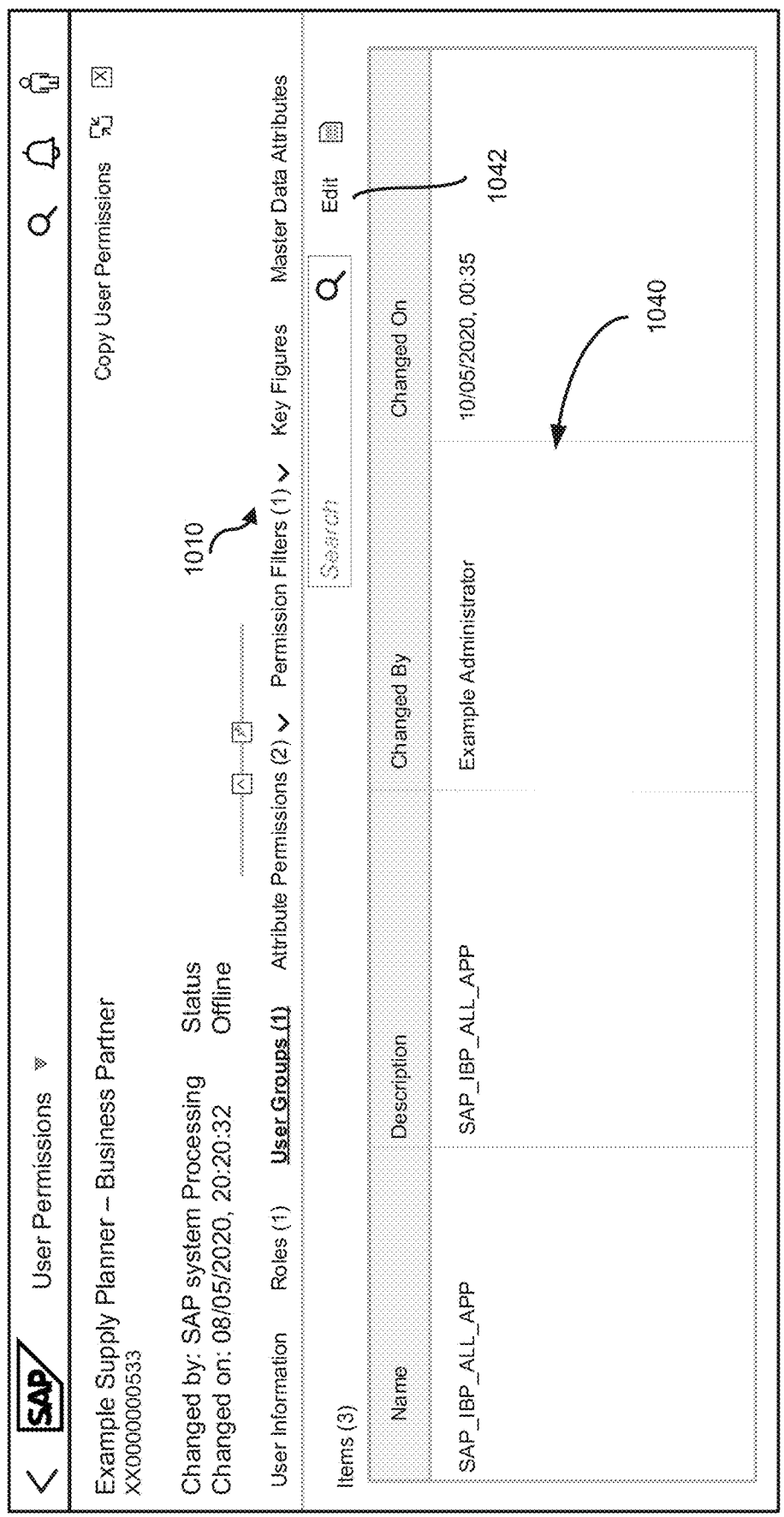
FIG. 13 is an example user interface of the integrated user privilege management application of FIG. 8, where a list of user groups to which a user belong are displayed.
Figure 14:
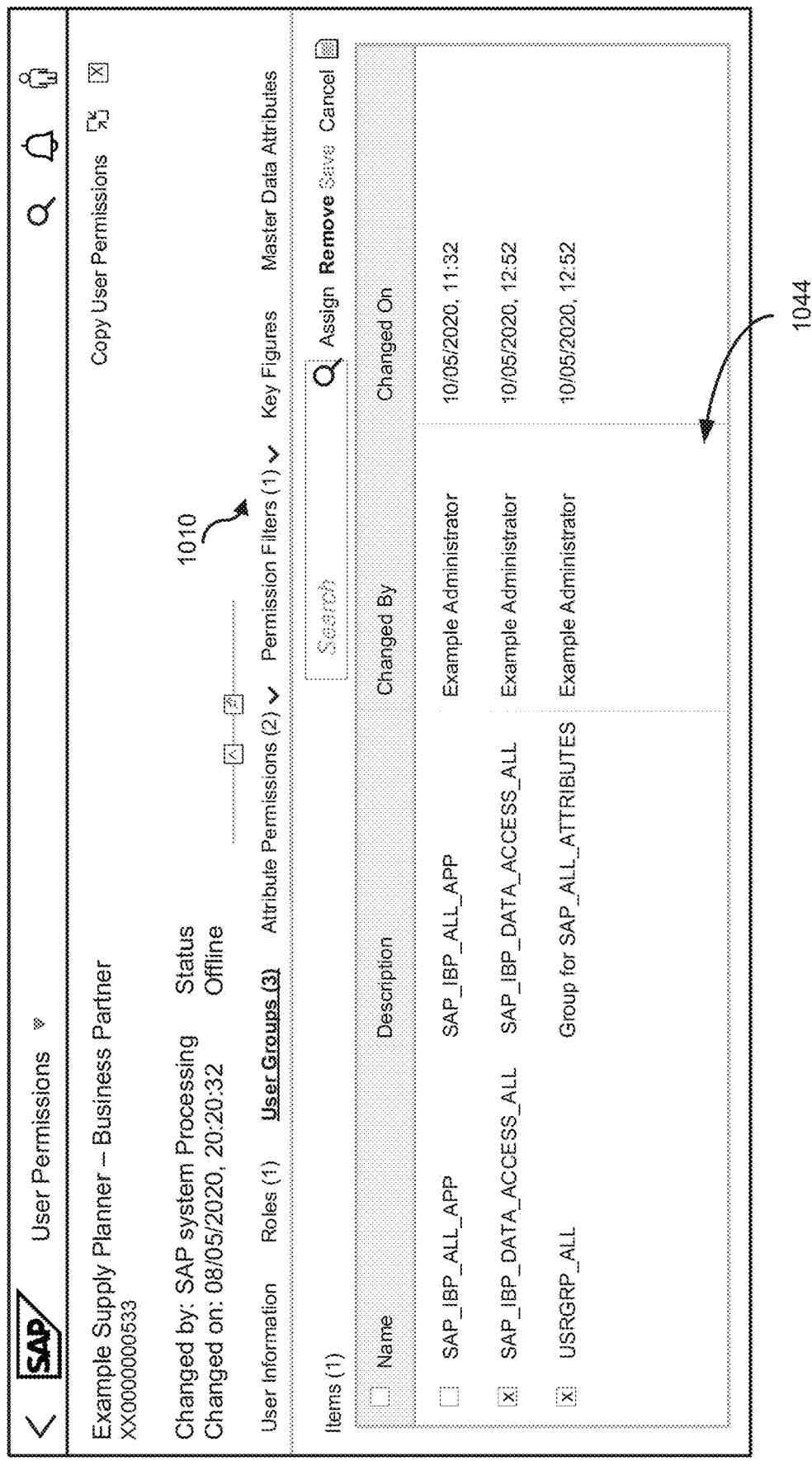
FIG. 14 is an example user interface of the integrated user privilege management application of FIG. 8, where a user can be assigned and/or unassigned to multiple user groups.

FIG. 13 shows the example user interface 1000 when the "User Groups" tab is selected. In certain embodiments, selecting the "User Groups" tab can invoke another application (e.g., via a corresponding API) that manages the user group objects. As shown, all user group objects 1040 to which the selected user is assigned can be displayed, along with related information of the user group objects (e.g., description, changed by, changed on, etc.). In this example, the selected user "Example Supply Planner—Business Partner" is assigned to only one user group object "SAP_IBP_ALL_APP." In addition, by clicking an "Edit" button 1042, a popup window 1044 can appear which lists a plurality of user group objects, as shown in FIG. 14. The administrator can then assign and/or unassign the selected user to any of the listed user group objects (e.g., by checking and/or unchecking boxes associated with the respective user group objects). As described above, changing user group objects associated with a user can cause corresponding changes to associated record filters objects and attribute filter objects, as well as access privileges to related key figures and master data attributes. Thus, by navigating to the "Permission Filters" and "Attribute Permissions" tabs, or "Key Figures" and "Master Data Attributes" tabs, the administrator can immediately see the impact of assigning and/or unassigning the selected user to different user group objects. In addition, the administrator can navigate to a specific user group object (e.g., via hyperlink or other means) to perform further analysis. Further, the user interface 1000 can be configured to support download functionality through which the administrator can export the list of user group objects associated with the selected user.

Figure 15:
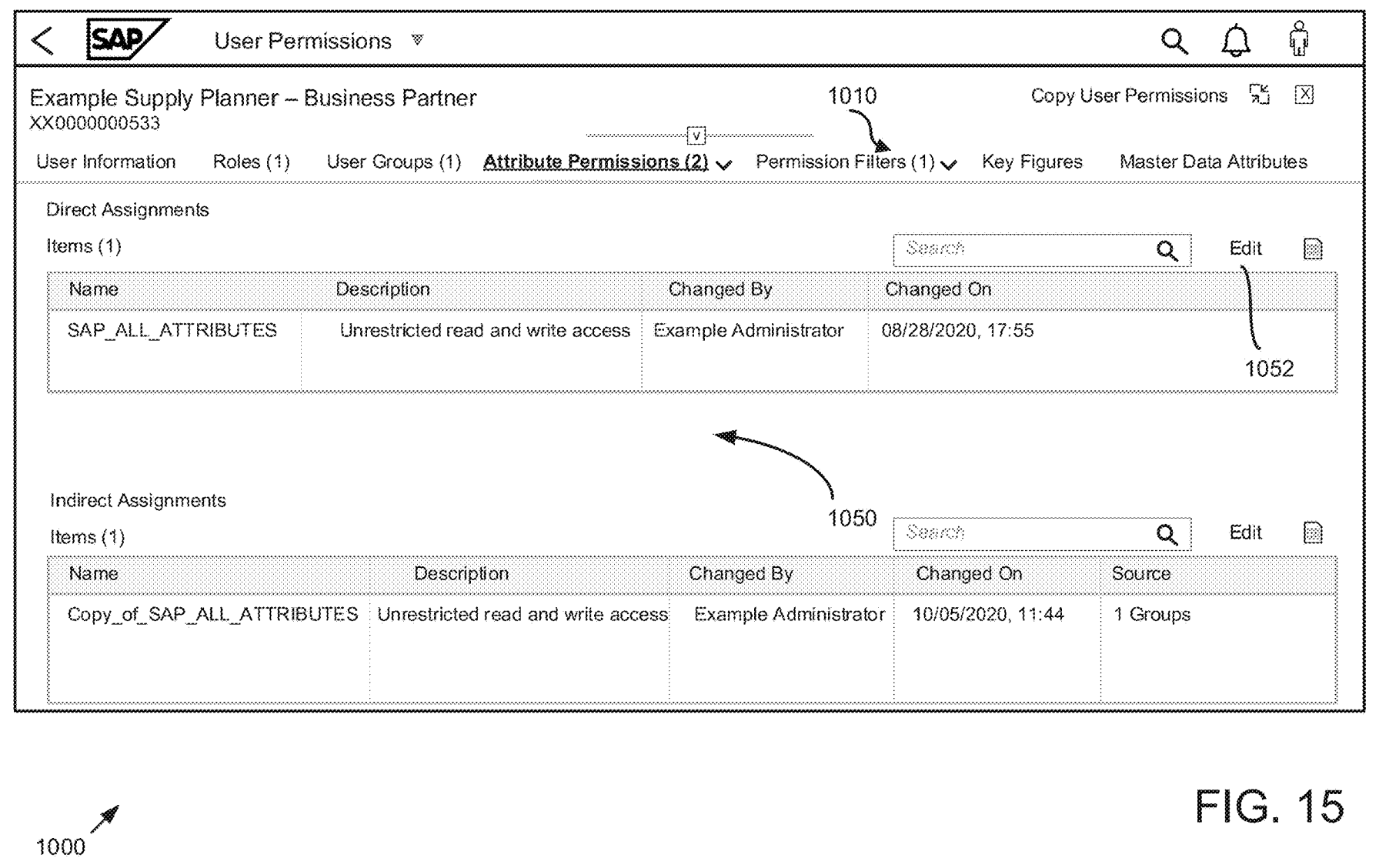
Figure 16:
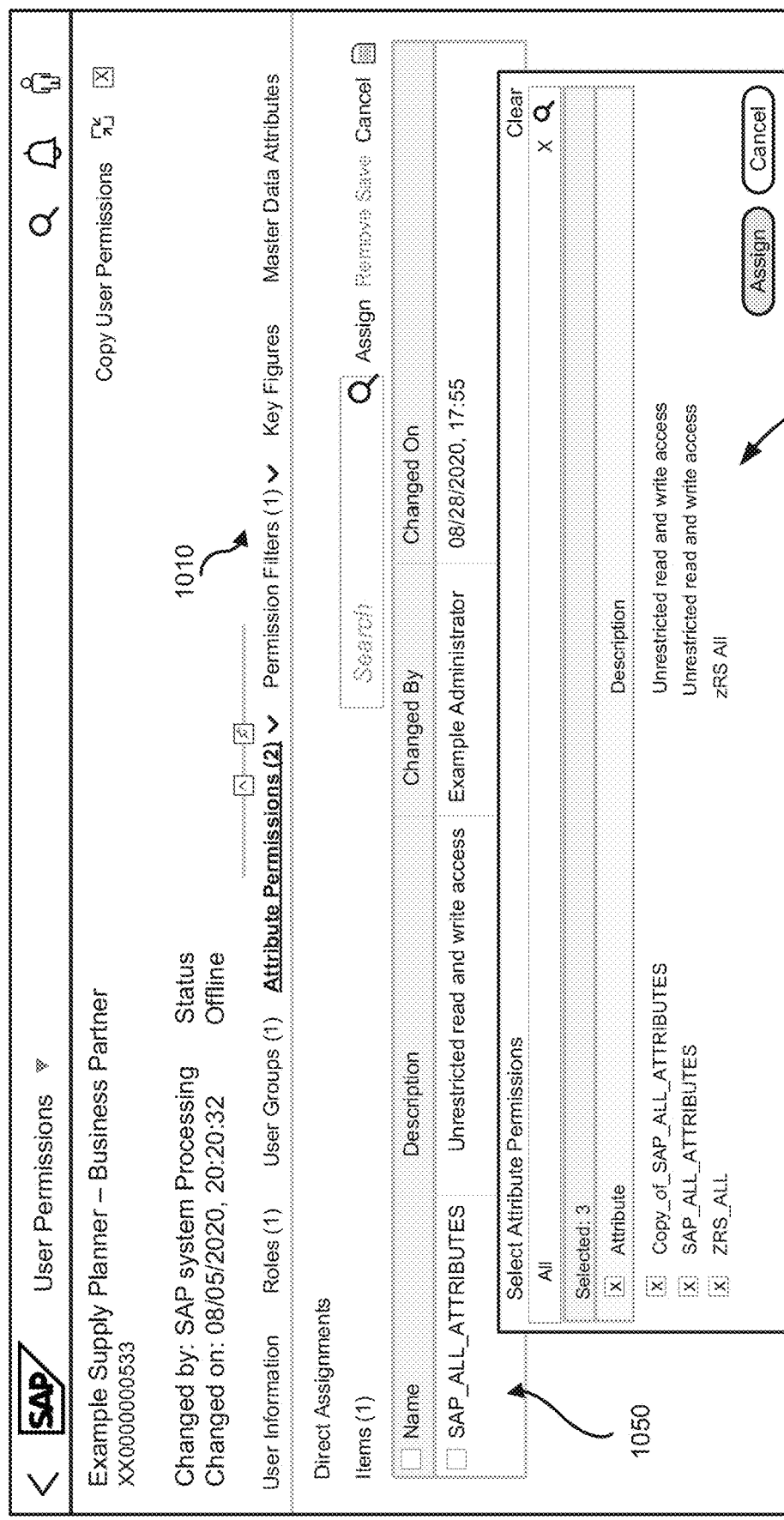
FIG. 16 is an example user interface of the integrated user privilege management application of FIG. 8, where one or more attribute permissions can be assigned and/or unassigned to a user.

FIG. 15 shows the example user interface 1000 when the "Attribute Permissions" tab is selected. In certain embodiments, selecting the "Attribute Permissions" tab can invoke another application (e.g., via a corresponding API) that manages the attribute filter objects. As shown, all attribute filter objects 1050 assigned to the selected user and related information of the attribute filter objects (e.g., description, changed by, changed on, etc.) can be displayed. In certain embodiments, as shown in this example, attribute filter objects directly and indirectly assigned to the selected user can be listed separately. As noted above, an attribute filter object can be indirectly assigned to a user when the user belongs to a user group to which the attribute filter object is assigned. In addition, the administrator can edit attribute filter objects assigned to the selected user. For example, by clicking an "Edit" button 1052, a popup window 1054 can appear, as shown in FIG. 16, which lists a plurality of attribute filter objects that can be assigned and/or unassigned to the selected user (e.g., by checking and/or unchecking boxes associated with the respective attribute filter objects). As described above, changing attribute filter objects assigned to a user can affect related access privileges to master data attributes. Thus, by navigating to the "Master Data Attributes" tab, the administrator can immediately see the impact of assignment and/or un-assignment of the attribute filter objects to the selected user. In addition, the administrator can navigate to a specific attribute filter object (e.g., via hyperlink or other means) to perform further analysis. Further, the user interface 1000 can be configured to support download functionality through which the administrator can export the list of attribute filter objects assigned to the selected user.

Figure 17:
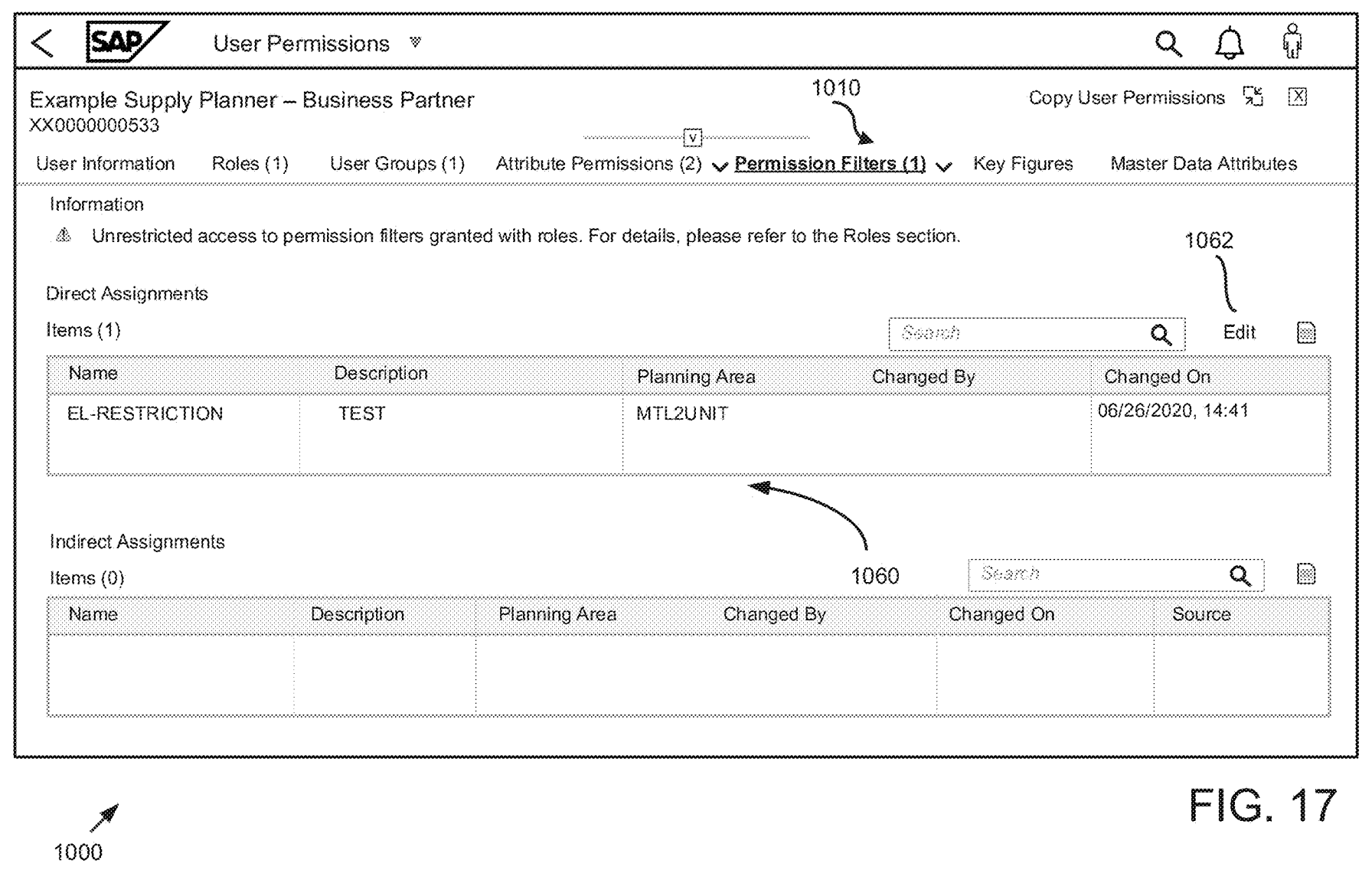

FIG. 17 shows the example user interface 1000 when the "Permission Filters" tab is selected. In certain embodiments, selecting the "Permission Filters" tab can invoke another application (e.g., via a corresponding API) that manages the record filter objects. As shown, all record filter objects 1060 assigned to the selected user and related information of the record filter objects (e.g., description, changed by, changed on, etc.) can be displayed. In certain embodiments, as shown in this example, record filter objects directly and indirectly assigned to the selected user can be listed separately. As noted above, a record filter object can be indirectly assigned to a user when the user belongs to a user group to which the record filter object is assigned. In addition, the administrator can edit record filter objects assigned to the selected user. For example, by clicking an "Edit" button 1062, a popup window 1064 can appear, as shown in FIG. 18, which lists a plurality of record filter objects that can be assigned and/or unassigned to the selected user (e.g., by checking and/or unchecking boxes associated with the respective record filter objects). As described above, changing record filter objects assigned to a user can affect related access privileges to key figures. Thus, by navigating to the "Key Figures" tab, the administrator can immediately see the impact of assignment and/or un-assignment of the record filter objects to the selected user. In addition, the administrator can navigate to a specific record filter object (e.g., via hyperlink or other means) to perform further analysis. Further, the user interface 1000 can be configured to support download functionality through which the administrator can export the list of record filter objects assigned to the selected user.

Figure 19:
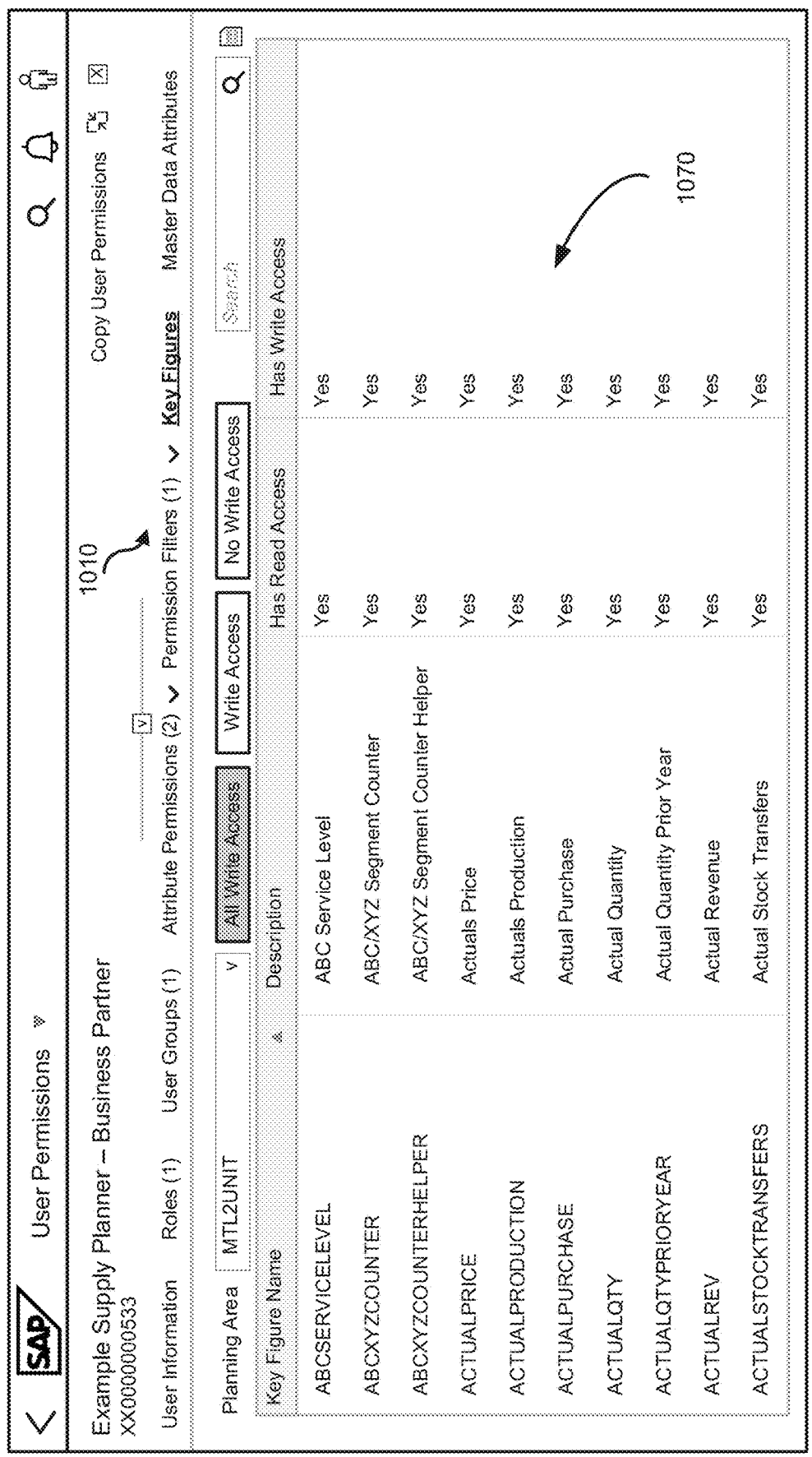
FIG. 19 is an example user interface of the integrated user privilege management application of FIG. 8, where a list of key figures to which a user has access privileges are displayed.

FIG. 19 shows the example user interface 1000 when the "Key Figures" tab is selected. As shown, a key figure table 1070 listing all key figures that the selected user has access privileges can be displayed. As noted above, roles and record filters assigned to the user and the user groups to which the user belong can directly impact the key figures to which the user has access privileges, and any change to the role objects, user group objects, or record filter objects can simultaneously cause update of the key figure table 1070. Thus, the administrator can use the key figure table 1070 for troubleshooting, root cause analysis or to understand the impact of changes done to relevant permission objects. In addition, the user interface 1000 can be configured to support download functionality through which the administrator can export the list of key figures to which the selected user has access privileges.

Figure 20:
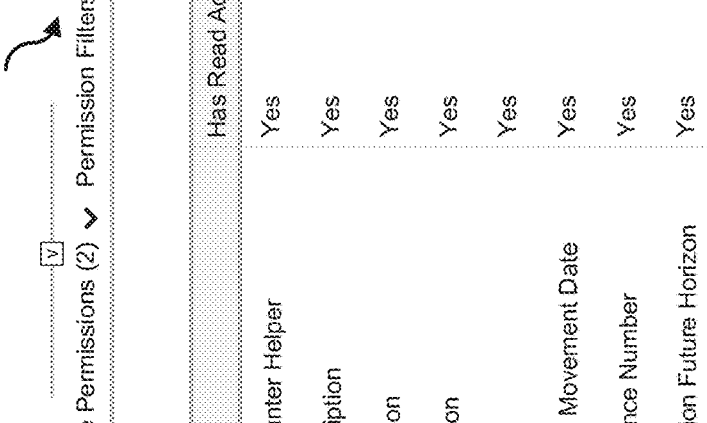
FIG. 20 is an example user interface of the integrated user privilege management application of FIG. 8, where a list of master data attributes to which a user has access privileges are displayed.

FIG. 20 shows the example user interface 1000 when the "Master Data Attributes" tab is selected. As shown, a master data attributes table 1080 listing all master data attributes that the selected user has access privileges can be displayed. As noted above, attribute filters assigned to the user and the user groups to which the user belong can directly impact the master data attributes to which the user has access privileges, and any change to the user group objects, or attribute filter objects can simultaneously cause update of the master data attributes table 1080. Thus, the administrator can use the master data attributes table 1080 for troubleshooting, root cause analysis or to understand the impact of changes done to relevant permission objects. In addition, the user interface 1000 can be configured to support download functionality through which the administrator can export the list of master data attributes to which the selected user has access privileges.

Figure 21:
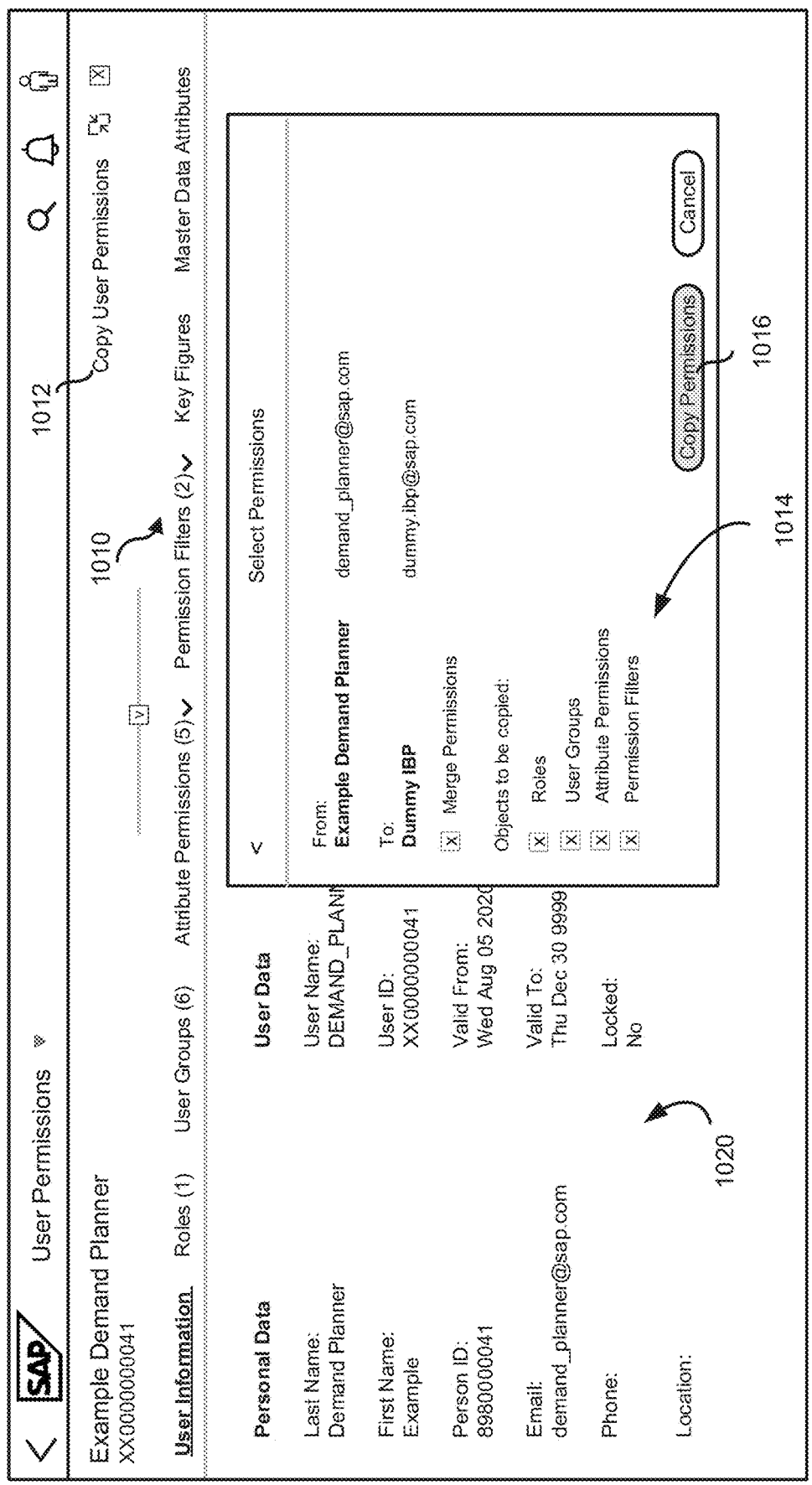
FIG. 21 is an example user interface of the integrated user privilege management application of FIG. 8, where selected permission objects of one user can be copied to another user.

FIG. 21 shows the example user interface 1000 which supports the functionality of copying or cloning permission objects. For example, by selecting a "Copy User Permissions" button 1012 in the details page of a selected user (or alternatively, selecting a user 810 and then selecting a "Copy User Permissions" button 822 in the overview page, as shown in FIG. 8), a popup dialog window 1014 can appear which allows the administrator to clone or copy selected permission objects assigned to one user (also referred to as the "source user") to another user (also referred to as the "target user") via a single presented user interface action, e.g., by clicking a "Copy Permissions" button 1016. In the depicted embodiment, the originally selected user is the source user, and the target user can be separately selected in the dialog window 1014. Alternatively, the originally selected user can be the target user, and the source user can be separately selected in the dialog window 1014. As shown, the administrator can choose one of several following copy options, such as copying all available permission objects from the source user to the target user (which can be set as a default behavior), copying selected permission objects from the source user to the target user, merging all permission objects (which can be set as a default behavior) or only selected existing permission objects of the source user with those of the target user. For example, if the administrator does not select the "Merge Permissions" option, the existing permission objects of the target user can be deleted after copying the permission objects from the source user to the target user. In other words, selecting the "Merge Permissions" option allows the target user to preserve its original permission objects while being assigned new permission objects from the source user, whereas not selecting this options causes the target user's permission objects to be overwritten by the permission objects of the source user. Thus, instead of creating permission objects for a target user from scratch (e.g., assigning individual permission objects to the target user sequentially), which can be time consuming when the number of permission objects is large (e.g., tens or even hundreds), the technology described herein can improve the efficiency by allowing copying selected permission objects from a source user (whose access privileges are similar to the target user) to the target user via a single user interface action. If needed, the copied permission objects of the target user can be further adjusted (e.g., addition or removal) to fine tune the access privileges of the target user.

Figure 22:
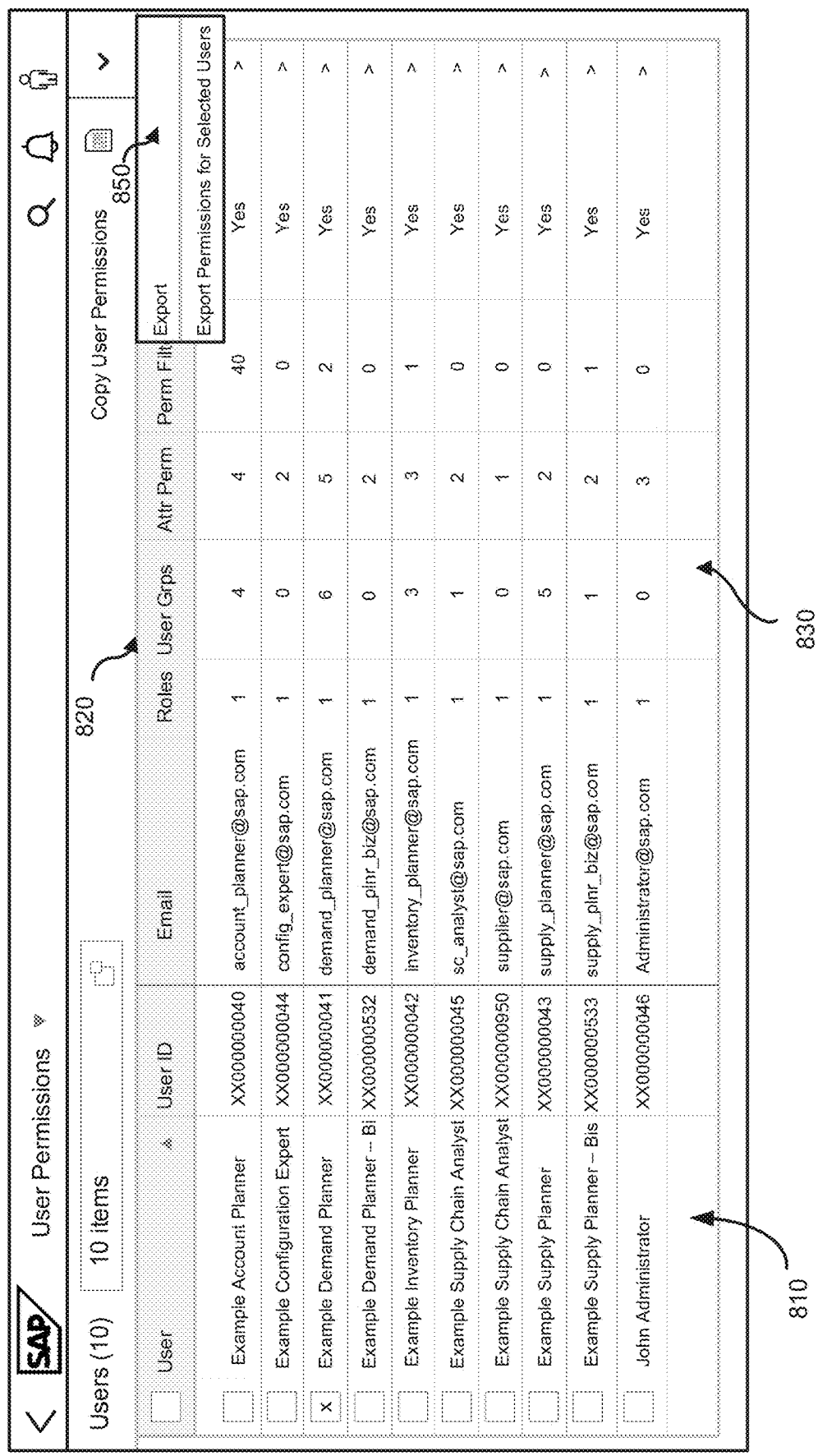
FIG. 22 is an example user interface of the integrated user privilege management application of FIG. 8, where permission objects of all or selected users can be downloaded.

FIG. 22 shows the same user interface 800 as in FIG. 8 except that it includes a dropdown menu 850, which allows the administrator to download/export users' permission objects and other relevant information for audit and/or analysis purposes. For example, the administrator can choose to download permission objects of all users shown in the overview page (e.g., by clicking the menu item "Export") or download/export permission objects of selected users (e.g., by clicking the menu item "Export Permissions for Selected Users"). Similar downloading/exporting functionality can be implemented in the user interface 1000 showing details page of a selected user, as noted above.

FIGS. 23-24 show some example user interfaces of another integrated user privilege management application that can be used by a user who is not an administrator. Through such user interfaces, the user can view permission objects assigned to him (and/or may be others) but cannot assign/unassign permission objects. In other words, such application can act as a self-serve option for a user and show the user's access privilege information in a read-only mode. As examples, the user interface 2300 in FIG. 23 shows the detailed user information 2320 similar to the user interface 1000 depicted in FIG. 10, and the user interface 2300 in FIG. 24 shows the role objects assigned to the user similar to the user interface 1000 depicted in FIG. 11. Similarly to the user interface 1000, user can review different permission objects via navigation tabs 2310 and may download the permission objects for records. However, there is no "Edit" button for the user to change any of the permission objects assigned to the user.

Example 7—Example Method of Managing Racing Conditions

As described above, each type of permission object (e.g., attribute filter objects, record filter objects, role objects, and user group objects) can be provided and managed by external APIs which are not owned by the integrated user privilege management application. In certain embodiments, the integrated user privilege management application has no persistency of its own and has no exclusive locking mechanism on any of the permission objects being edited. For example, as shown in FIG. 3, while the integrated user privilege management application 320 is editing one of the permission objects (e.g., 330, 340, 350, and 360), there is a possibility that the same permission object is also edited by another user 310 directly (e.g., via the direct interface 312, 314, 316, and 318). This can lead to a racing condition if the same permission object assigned to a user are being updated simultaneously edited in their responsible application or gateway service.

In practice, the permission objects can be physically stored in the database privilege management engine 440 (see, e.g., FIG. 4), which represents a data tier. The permission objects shown on the application user interface (e.g., 1000) represent a presentation tier. The permission objects in the presentation tier are retrieved from the data tier at a particular time instance (e.g., when launching the integrated user privilege management application). Thus, the racing condition can occur when an administrator attempts to change a permission object in the presentation tier without knowing that the same permission object in the data tier has already been changed by another software applications or gateway service.

To handle such situation, the integrated user privilege management application (e.g., 320 or 420) can be configured to determine that a permission object (e.g., a role object, a record filter object, an attribute filter object, or a user group object) has not been modified by another process before modifying the permission object. Specifically, after an administrator makes a change to any of the permission object via the user interface (i.e., in the presentation tier), before committing such change, i.e., actually changing the permission object in the data tier, the integrated user privilege management application can first retrieve the most recent permission object stored in the data tier, and then comparing it to the permission objects in the presentation tier.

Based on such comparison, there can be four possible scenarios: (1) The integrated user privilege management application adds a set of access privileges in the presentation tier which are different from access privileges recently changed (by an external application) in the data tier due to the racing condition. This scenario results in a "delta" operation. (2) The integrated user privilege management application deletes a set of access privileges in the presentation tier which are different from access privileges recently changed (by an external application) in the data tier due to the racing condition. This scenario also results in a "delta" operation. (3) Both the integrated user privilege management application and the external application add the same set of access privileges. This scenario results in a "redundant" operation. (4) Both the integrated user privilege management application and the external application delete the same set of access privileges. This scenario also results in a "redundant" operation.

As described herein, the integrated user privilege management application can eliminate any "redundant" operations (i.e., the same change to access privileges is ignored if such change is already made). After eliminating the "redundant" operations, if no "delta" operations is found, a commitment can be made so that access privileges made in the presentation tier can be saved in respective permission objects on the data tier. On the other hand, if a "delta" operation is found, the administrator can be presented with an updated list of unsaved right privilege data including the recent changes, and a warning message about the access privilege discrepancy between the presentation tier and data tier can be displayed. The administrator can then choose to either confirm or discard changes made to access privileges in the presentation tier.

Example 8—Example Advantages

As noted above, conventional database user privilege management can be very complicated due to the inter-relationship between users, roles, user groups, attribute filters, and record filters. For example, in order to troubleshoot a user's access privilege issues or to change certain access privilege of the user, conventional method would require invoking respective applications to review or manage different permission objects (e.g., role objects, attribute filter objects, record filter objects, and user group objects). Once invoking such application, it is also necessary to find the correct permission object and adjust for the user. Such process can be time consuming and error prone, especially when there is a large number of permission objects and/or users. Further, even after changing a permission object associated with the user, it may still be unclear if the change fixes the user's access privilege issues because changing one permission object may cause corresponding changes to other permission objects and indirectly affect the user's access privileges.

The technology described herein can overcome many of the problems noted above and have a number of advantages. Importantly, the disclosed technology provides a user-centric solution for integrated database user privilege management. For example, an administrator can log onto the integrated user privilege management application, select any user of the database and see all his access privileges. The application also provides a holistic view of permission objects assigned to all users of the database(s), and it allows the administrator to easily compare access privileges of two or more users in terms of permission objects. If needed, the administrator can assign and/or unassign multiple permission objects to the user with a few clicks. The application also allows an administrator to copy (or merge) selected or all permission objects associated with one user to another user. Once the administrator makes any change to a permission object, the impact of such change on key figures and/or master data attributes can be immediately reviewed (e.g., by navigating to the respective tabs, as illustrated in FIGS. 19-20). Thus, the disclosed integrated user privilege management application provides a user-friendly and convenient platform for the administrator to manage users' access privileges and troubleshoot related issues. In addition, the disclosed integrated user privilege management application can also be configured to operate in read-only mode so as to provide a self-serve option for end users to view his own access privileges. Moreover, the disclosed technology can be easily integrated with many database user privilege management systems running on different platforms. For example, instead of implementing comprehensive user privilege management by itself, the disclosed integrated user privilege management application can integrate multiple APIs of external applications that manage respective permission objects while properly handling the racing conditions to ensure the data integrity about users' access privileges.

Example 9—Example Computing Systems

Figure 25:
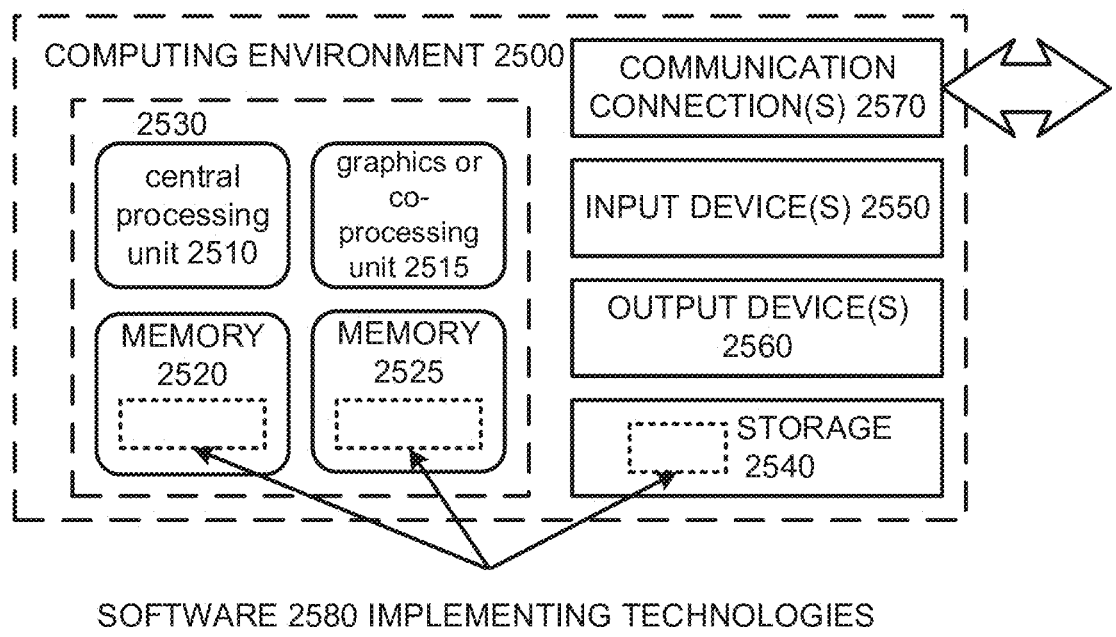
FIG. 25 is a block diagram of an example computing system in which described embodiments can be implemented.

FIG. 25 depicts an example of a suitable computing system 2500 in which the described innovations can be implemented. The computing system 2500 is not intended to suggest any limitation as to scope of use or functionality of the present disclosure, as the innovations can be implemented in diverse computing systems.

With reference to FIG. 25, the computing system 2500 includes one or more processing units 2510, 2515 and memory 2520, 2525. In FIG. 25, this basic configuration 2530 is included within a dashed line. The processing units 2510, 2515 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 25 shows a central processing unit 2510 as well as a graphics processing unit or co-processing unit 2515. The tangible memory 2520, 2525 can be volatile memory (e.g., registers, cache, RAM), non-volatile memory (e.g., ROM, EEPROM, flash memory, etc.), or some combination of the two, accessible by the processing unit(s) 2510, 2515. The memory 2520, 2525 stores software 2580 implementing one or more innovations described herein, in the form of computer-executable instructions suitable for execution by the processing unit(s) 2510, 2515.

A computing system 2500 can have additional features. For example, the computing system 2500 includes storage 2540, one or more input devices 2550, one or more output devices 2560, and one or more communication connections 2570, including input devices, output devices, and communication connections for interacting with a user. An interconnection mechanism (not shown) such as a bus, controller, or network interconnects the components of the computing system 2500. Typically, operating system software (not shown) provides an operating environment for other software executing in the computing system 2500, and coordinates activities of the components of the computing system 2500.

The tangible storage 2540 can be removable or non-removable, and includes magnetic disks, magnetic tapes or cassettes, CD-ROMs, DVDs, or any other medium which can be used to store information in a non-transitory way and which can be accessed within the computing system 2500. The storage 2540 stores instructions for the software implementing one or more innovations described herein.

The input device(s) 2550 can be an input device such as a keyboard, mouse, pen, or trackball, a voice input device, a scanning device, touch device (e.g., touchpad, display, or the like) or another device that provides input to the computing system 2500. The output device(s) 2560 can be a display, printer, speaker, CD-writer, or another device that provides output from the computing system 2500.

The communication connection(s) 2570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 10—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 11—Example Cloud Computing Environment

Figure 26:
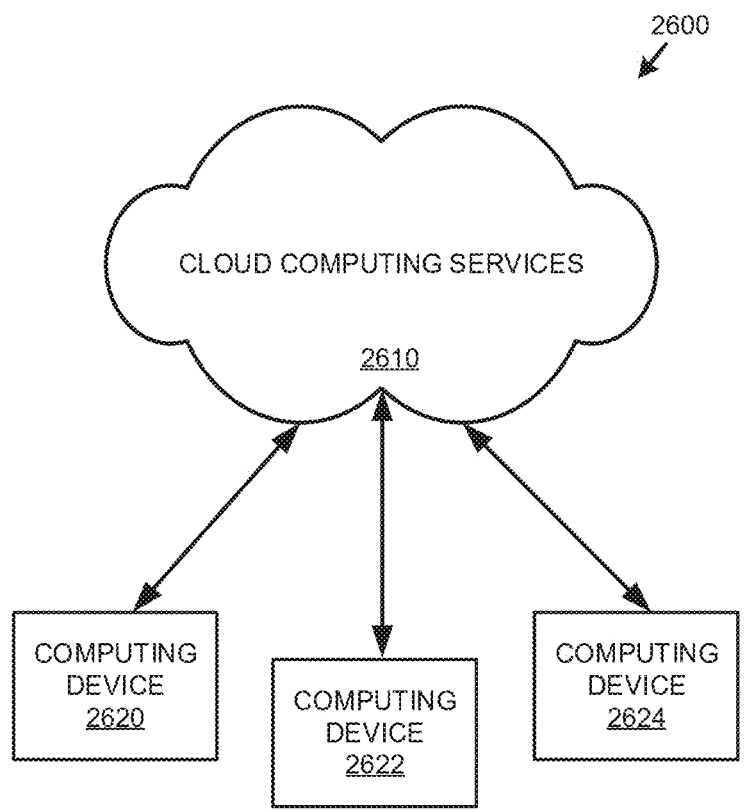
FIG. 26 is a block diagram of an example cloud computing environment that can be used in conjunction with the technologies described herein.

FIG. 26 depicts an example cloud computing environment 2600 in which the described technologies can be implemented, including, e.g., the system disclosed above and other systems herein. The cloud computing environment 2600 comprises cloud computing services 2610. The cloud computing services 2610 can comprise various types of cloud computing resources, such as computer servers, data storage repositories, networking resources, etc. The cloud computing services 2610 can be centrally located (e.g., provided by a data center of a business or organization) or distributed (e.g., provided by various computing resources located at different locations, such as different data centers and/or located in different cities or countries).

The cloud computing services 2610 are utilized by various types of computing devices (e.g., client computing devices), such as computing devices 2620, 2622, and 2623. For example, the computing devices (e.g., 2620, 2622, and 2624) can be computers (e.g., desktop or laptop computers), mobile devices (e.g., tablet computers or smart phones), or other types of computing devices. For example, the computing devices (e.g., 2620, 2622, and 2624) can utilize the cloud computing services 2610 to perform computing operations (e.g., data processing, data storage, and the like).

In practice, cloud-based, on-premises-based, or hybrid scenarios can be supported.

Example 12—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

In addition, although the technology disclosed herein refers to specific permission objects (e.g., role objects, record filter objects, attribute filter objects, user group objects) having specific features, it is to be understood that the principles of the disclosed technology can also be applied to other variants of permission objects, such as the row and column access control (which controls access to a database table at the row level, column level, or both), or the like.

Example 13—Example Embodiments

Any of the following embodiments can be implemented.

Clause 1. A computer-implemented method comprising: presenting a computer interface for managing access privileges of one or more users to a database comprising independent data and dependent data, wherein the dependent data changes more frequently than the independent data; retrieving one or more role objects, one or more record filter objects, and one or more attribute filter objects assigned to a user, wherein a role object defines access privileges to selected values of the independent data and the dependent data, a record filter object is configured to modify the access privileges defined in the one or more role objects, and an attribute filter object defines access privileges to selected attributes of the independent data; calculating a list of attributes of the independent data and a list of dependent data that the user has access privileges based on the one or more role objects, one or more record filter objects, and one or more attribute filter objects assigned to the user; and presenting, on the computer interface, the list of attributes of the independent data and the list of dependent data that the user has access privileges.

Clause 2. The method of clause 1, further comprising summarizing on the computer interface counts of role objects, counts of record filter objects, and counts of attribute filter objects respectively assigned to the one or more users.

Clause 3. The method of any one of clauses 1-2, further comprising assigning the user to at least one user group, and refreshing simultaneously the list of attributes of the independent data and the list of dependent data that the user has access privileges if the at least one user group has access privileges defined by at least one record filter or one attribute filter.

Clause 4. The method of any one of clauses 1-3, further comprising receiving an indication to modify one of the one or more role objects assigned to the user, and refreshing simultaneously the list of attributes of the independent data and the list of dependent data that the user has access privileges.

Clause 5. The method of any one of clauses 1-4, further comprising receiving an indication to modify one of the one or more record filters assigned to the user, and refreshing simultaneously the list of dependent data that the user has access privileges.

Clause 6. The method of any one of clauses 1-5, further comprising receiving an indication to modify one of the one or more attribute filters assigned to the user, and refreshing simultaneously the list of attributes of the independent data that the user has access privileges.

Clause 7. The method of any one of clauses 1-6, further comprising cloning at least some of the one or more role objects, the one or more record filter objects, or the one or more attribute filter objects assigned to the user to another user via a single presented user interface action.

Clause 8. The method of any one of clauses 1-7, further comprising calculating access privilege to a dependent data based on a logical operation of a plurality of values of the independent data, and removing the access privilege to the dependent data if access privilege to one of the plurality of values of the independent data is removed.

Clause 9. The method of any one of clauses 1-8, further comprising determining a privilege object has not been modified by another process before modifying the privilege object, wherein the privilege object is one of the one or more role objects, the one or more record filter objects, or the one or more attribute filter objects.

Clause 10. The method of any one of clauses 1-9, further comprising exporting at least one of the one or more role objects, the one or more record filter objects, or the one or more attribute filter objects assigned to the user to a data file.

Clause 11. A computing system comprising: memory; one or more hardware processors coupled to the memory; and one or more computer readable storage media storing instructions that, when loaded into the memory, cause the one or more hardware processors to perform operations comprising: presenting a computer interface for managing access privileges of one or more users to a database comprising independent data and dependent data, wherein the dependent data changes more frequently than the independent data; retrieving one or more role objects, one or more record filter objects, and one or more attribute filter objects assigned to a user, wherein a role object defines access privileges to selected values of the independent data and the dependent data, a record filter object is configured to modify the access privileges defined in the one or more role objects, and an attribute filter object defines access privileges to selected attributes of the independent data; calculating a list of attributes of the independent data and a list of dependent data that the user has access privileges based on the one or more role objects, one or more record filter objects, and one or more attribute filter objects assigned to the user; and presenting, on the computer interface, the list of attributes of the independent data and the list of dependent data that the user has access privileges.

Clause 12. The system of clause 11, wherein the operations further comprise summarizing on the computer interface counts of role objects, counts of record filter objects, and counts of attribute filter objects respectively assigned to the one or more users.

Clause 13. The system of any one of clauses 11-12, wherein the operations further comprise assigning the user to at least one user group, and refreshing simultaneously the list of attributes of the independent data and the list of dependent data that the user has access privileges if the at least one user group has access privileges defined by at least one record filter or one attribute filter.

Clause 14. The system of any one of clauses 11-13, wherein the operations further comprise receiving an indication to modify one of the one or more role objects assigned to the user, and refreshing simultaneously the list of attributes of the independent data and the list of dependent data that the user has access privileges.

Clause 15. The system of any one of clauses 11-14, wherein the operations further comprise receiving an indication to modify one of the one or more record filters assigned to the user, and refreshing simultaneously the list of dependent data that the user has access privileges.

Clause 16. The system of any one of clauses 11-15, wherein the operations further comprise receiving an indication to modify one of the one or more attribute filters assigned to the user, and refreshing simultaneously the list of attributes of the independent data that the user has access privileges.

Clause 17. The system of any one of clauses 11-16, wherein the operations further comprise cloning at least some of the one or more role objects, the one or more record filter objects, or the one or more attribute filter objects assigned to the user to another user via a single presented user interface action.

Clause 18. The system of any one of clauses 11-17, wherein access privilege to a dependent data is determined by a logical operation of a plurality of values of the independent data, wherein the access privilege to the dependent data is removed if access privilege to one of the plurality of values of the independent data is removed.

Clause 19. The system of any one of clauses 11-18, wherein the operations further comprise exporting at least one of the one or more role objects, the one or more record filter objects, or the one or more attribute filter objects assigned to the user to a data file.

Clause 20. One or more computer-readable media containing program instructions for causing a computer to perform a method comprising: presenting a computer interface for managing access privileges of one or more users to a database comprising independent data and dependent data, wherein the dependent data changes more frequently than the independent data; retrieving one or more role objects, one or more record filter objects, and one or more attribute filter objects assigned to a user, wherein a role object defines access privileges to selected values of the independent data and the dependent data, a record filter object is configured to modify the access privileges defined in the one or more role objects, and an attribute filter object defines access privileges to selected attributes of the independent data; calculating a list of attributes of the independent data and a list of dependent data that the user has access privileges based on the one or more role objects, one or more record filter objects, and one or more attribute filter objects assigned to the user; presenting, on the computer interface, the list of attributes of the independent data and the list of dependent data that the user has access privileges; receiving an indication to modify one of the one or more role objects assigned to the user, and refreshing simultaneously the list of attributes of the independent data and the list of dependent data that the user has access privileges; receiving an indication to modify one of the one or more record filters assigned to the user, and refreshing simultaneously the list of dependent data that the user has access privileges; and receiving an indication to modify one of the one or more attribute filters assigned to the user, and refreshing simultaneously the list of attributes of the independent data that the user has access privileges.

Example 14—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
presenting a computer interface for managing access privileges of one or more users to a database comprising independent data and dependent data, wherein the dependent data changes more frequently than the independent data;
retrieving one or more role objects, one or more record filter objects, and one or more attribute filter objects assigned to a user, wherein a role object defines access privileges to selected values of the independent data and the dependent data, a record filter object is configured to modify the access privileges defined in the one or more role objects, and an attribute filter object defines access privileges to selected attributes of the independent data;
calculating a list of attributes of the independent data and a list of dependent data that the user has access privileges based on the one or more role objects, one or more record filter objects, and one or more attribute filter objects assigned to the user; and
presenting, on the computer interface, the list of attributes of the independent data and the list of dependent data that the user has access privileges, wherein the method further comprises:
cloning at least some of the one or more role objects, the one or more record filter objects, or the one or more attribute filter objects assigned to the user to another user via a single presented user interface action; and
exporting at least one of the one or more role objects, the one or more record filter objects, or the one or more attribute filter objects assigned to the user.

2. The method of claim 1, further comprising summarizing on the computer interface counts of role objects, counts of record filter objects, and counts of attribute filter objects respectively assigned to the one or more users.

3. The method of claim 1), further comprising assigning the user to at least one user group, and refreshing simultaneously the list of attributes of the independent data and the list of dependent data that the user has access privileges if the at least one user group has access privileges defined by at least one record filter or one attribute filter.

4. The method of claim 1), further comprising receiving an indication to modify one of the one or more role objects assigned to the user, and refreshing simultaneously the list of attributes of the independent data and the list of dependent data that the user has access privileges.

5. The method of claim 1), further comprising receiving an indication to modify one of the one or more record filter objects assigned to the user, and refreshing simultaneously the list of dependent data that the user has access privileges.

6. The method of claim 1), further comprising receiving an indication to modify one of the one or more attribute filter objects assigned to the user, and refreshing simultaneously the list of attributes of the independent data that the user has access privileges.

7. The method of claim 1), further comprising calculating access privilege to a dependent data based on a logical operation of a plurality of values of the independent data, and removing the access privilege to the dependent data if access privilege to one of the plurality of values of the independent data is removed.

8. The method of claim 1), further comprising determining a privilege object has not been modified by another process before modifying the privilege object, wherein the privilege object is one of the one or more role objects, the one or more record filter objects, or the one or more attribute filter objects.

9. A computing system comprising:
  memory;
  one or more hardware processors coupled to the memory; and
  one or more computer readable storage media storing instructions that, when loaded into the memory, cause the one or more hardware processors to perform operations comprising:
  presenting a computer interface for managing access privileges of one or more users to a database comprising independent data and dependent data, wherein the dependent data changes more frequently than the independent data;
  retrieving one or more role objects, one or more record filter objects, and one or more attribute filter objects assigned to a user, wherein a role object defines access privileges to selected values of the independent data and the dependent data, a record filter object is configured to modify the access privileges defined in the one or more role objects, and an attribute filter object defines access privileges to selected attributes of the independent data;
  calculating a list of attributes of the independent data and a list of dependent data that the user has access privileges based on the one or more role objects, one or more record filter objects, and one or more attribute filter objects assigned to the user; and
  presenting, on the computer interface, the list of attributes of the independent data and the list of dependent data that the user has access privileges, wherein the operations further comprise:
  presenting a single user interface action that when activated, performs cloning at least some of the one or more role objects, the one or more record filter objects, or the one or more attribute filter objects assigned to the user to another user via the single presented user interface action; and
  presenting a user interface action that when activated, performs exporting at least one of the one or more role objects, the one or more record filter objects, or the one or more attribute filter objects assigned to the user for audit or analysis purposes.

10. The system of claim 9), wherein the operations further comprise summarizing on the computer interface counts of role objects, counts of record filter objects, and counts of attribute filter objects respectively assigned to the one or more users.

11. The system of claim 9), wherein the operations further comprise assigning the user to at least one user group, and refreshing simultaneously the list of attributes of the independent data and the list of dependent data that the user has access privileges if the at least one user group has access privileges defined by at least one record filter or one attribute filter.

12. The system of claim 9), wherein the operations further comprise receiving an indication to modify one of the one or more role objects assigned to the user, and refreshing simultaneously the list of attributes of the independent data and the list of dependent data that the user has access privileges.

13. The system of claim 9), wherein the operations further comprise receiving an indication to modify one of the one or more record filter objects assigned to the user, and refreshing simultaneously the list of dependent data that the user has access privileges.

14. The system of claim 9), wherein the operations further comprise receiving an indication to modify one of the one or more attribute filter objects assigned to the user, and refreshing simultaneously the list of attributes of the independent data that the user has access privileges.

15. The system of claim 9), wherein access privilege to a dependent data is determined by a logical operation of a plurality of values of the independent data, wherein the access privilege to the dependent data is removed if access privilege to one of the plurality of values of the independent data is removed.

16. One or more non-transitory computer-readable media containing program instructions for causing a computer to perform a method comprising:
  presenting a computer interface for managing access privileges of one or more users to a database comprising independent data and dependent data, wherein the dependent data changes more frequently than the independent data;
  retrieving one or more role objects, one or more record filter objects, and one or more attribute filter objects assigned to a user, wherein a role object defines access privileges to selected values of the independent data and the dependent data, a record filter object is configured to modify the access privileges defined in the one or more role objects, and an attribute filter object defines access privileges to selected attributes of the independent data;
  calculating a list of attributes of the independent data and a list of dependent data that the user has access privileges based on the one or more role objects, one or more record filter objects, and one or more attribute filter objects assigned to the user;
  presenting, on the computer interface, the list of attributes of the independent data and the list of dependent data that the user has access privileges;
  receiving an indication to modify one of the one or more role objects assigned to the user, and refreshing simultaneously the list of attributes of the independent data and the list of dependent data that the user has access privileges;
  receiving an indication to modify one of the one or more record filter objects assigned to the user, and refreshing simultaneously the list of dependent data that the user has access privileges; and
  receiving an indication to modify one of the one or more attribute filter objects assigned to the user, and refreshing simultaneously the list of attributes of the independent data that the user has access privileges, wherein the method further comprises:
  cloning at least some of the one or more role objects, the one or more record filter objects, or the one or more attribute filter objects assigned to the user to another user via a single presented user interface action; and
  exporting at least one of the one or more role objects, the one or more record filter objects, or the one or more attribute filter objects assigned to the user for audit or analysis purposes.

* * * * *